United States Patent [19]

Yachida

[11] Patent Number: 5,742,574
[45] Date of Patent: Apr. 21, 1998

[54] MAGNETO-OPTIC DISK DRIVE CONTROLLING APPARATUS

[75] Inventor: Masuyoshi Yachida, Yokohama, Japan

[73] Assignee: Ricoh Company, Ltd., Tokyo, Japan

[21] Appl. No.: 867,273

[22] Filed: Jun. 2, 1997

Related U.S. Application Data

[63] Continuation of Ser. No. 249,454, May 26, 1994, abandoned.

[30] Foreign Application Priority Data

May 26, 1993 [JP] Japan ................................ 5-124253
Dec. 15, 1993 [JP] Japan ................................ 5-314624

[51] Int. Cl.$^6$ ........................................................ G11B 7/00
[52] U.S. Cl. .................... 369/54; 369/58; 369/53; 369/47
[58] Field of Search .................... 369/54, 53, 58, 369/59, 47, 48, 49, 13, 124, 44.25, 32

[56] References Cited

U.S. PATENT DOCUMENTS 4,792,933 12/1988 Suzuki ........................ 369/54 X
4,821,254 4/1989 Satoh et al. .................. 369/54
5,473,581 12/1995 Yonezawa et al. ........... 369/13

*Primary Examiner*—Muhammad N. Edun
*Attorney, Agent, or Firm*—Cooper & Dunham LLP

[57] ABSTRACT

The reliability due to time-elapsing variation of the magneto-optic disk and the data recorded on the magneto-optic disk are evaluated. A magneto-optic disk driving apparatus can preserve a sheet of magneto-optic disk during the period over the endurable number of years, and a file manager can issue an alarm to the user in accordance with the deterioration state of the magneto-optic disk. The magneto-optic disk drive controlling apparatus for controlling the magneto-optic disk driving apparatus capable of taking in or taking out the magneto-optic disk by the operation of user's hands or the automatic transportation by use of the host computer comprises a disk deterioration judging (grasping) measure and a disk deterioration tolerance excess alarming measure. The file manager for realizing the IS&C file format in the magneto-optic disk by performing the operation of reading/writing the data on the magneto-optic disk in the magneto-optic disk driving apparatus by use of the execution program comprises a disk deterioration state grasping measure and a disk deterioration state alarming measure.

23 Claims, 19 Drawing Sheets

RECORDING

ERASING

FIG.18C
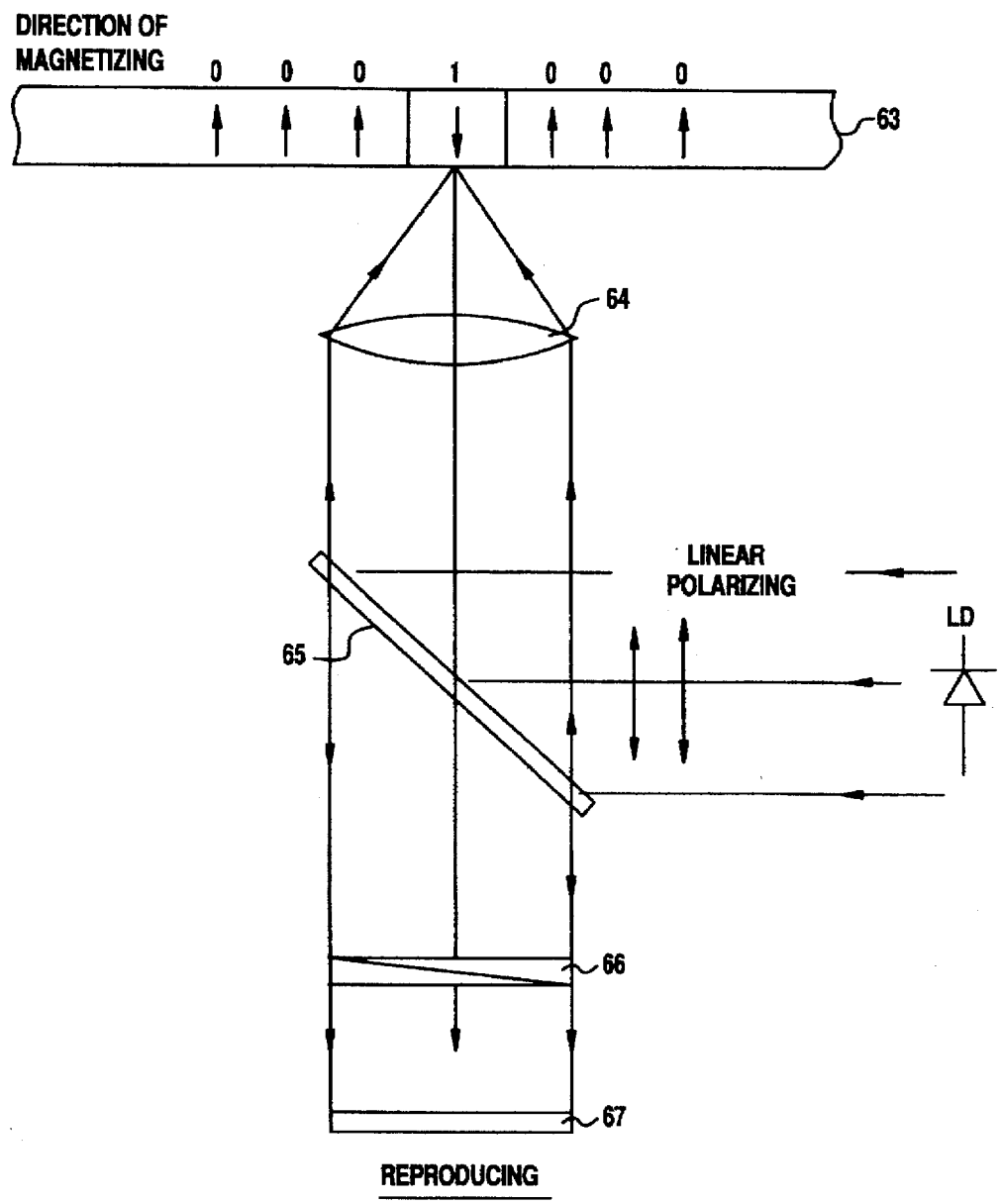
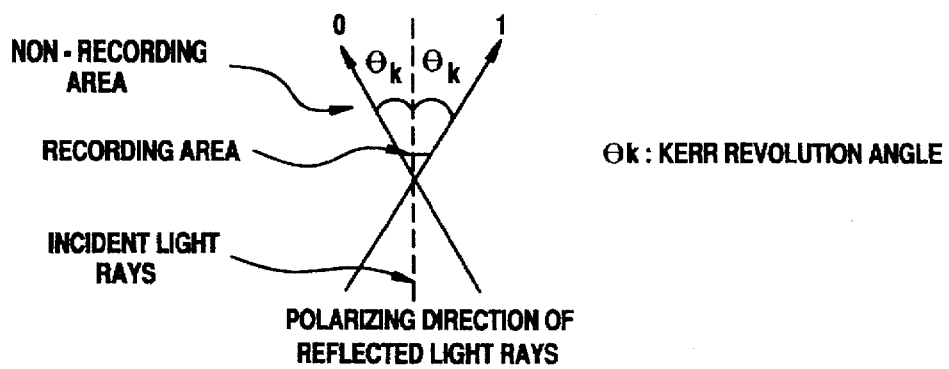

LIGHT BEAM FOR RECORDING / REPRODUCING

MAGNETO-OPTIC DISK DRIVE CONTROLLING APPARATUS

This is a continuation of application Ser. No. 08/249,454 filed May 26, 1994 now abandoned.

BACKGROUND OF THE INVENTION

1. Field of the Invention

The present invention relates to a magneto-optic disk drive controlling apparatus. More particularly, the present invention relates to a magneto-optic disk drive controlling apparatus for controlling a magneto-optic disk drive apparatus in which a magneto-optic disk is inserted and removed by manual operation or by automatic transportation using a host computer. The present invention also relates to a file manager for implementing an Image Save and Carry (IS&C) file format on the magneto-optic disk.

2. Description of the Prior Art

In recent years, magneto-optic disks have rapidly come into wide use as high-capacity portable information recording media. In particular, a 90 mm magneto-optic disk has become widely popular, and a 130 mm magneto-optic disk has found use in the standardization of medical-related data. FIG. 13 shows a schematic construction of a magneto-optic disk drive controlling apparatus, which includes a magneto-optic disk drive apparatus 1 and a host computer 2 for controlling the magneto-optic disk drive apparatus 1.

The magneto-optic disk drive apparatus 1 may be a type in which a magneto-optic disk is inserted and removed manually by a user's hand operation, or it may be a type in which a plurality of magneto-optic disks are transported by an automatic transporting apparatus. The magneto-optic disk drive apparatus 1 is usually controlled through a SCSI (Small Computer System Interface) port by the host computer 2.

The magneto-optic disk drive apparatus 1 performs the operations of reproducing data from (reading out) and recording data to (writing in) the magneto-optic disk under the control of the host computer 2. When data is recorded, the accuracy of the recorded data is immediately verified. If the magneto-optic disk drive apparatus 1 senses an abnormal state during verification, the following operations may take place:

1) the apparatus 1 may be restored to its original state;
2) the apparatus 1 may be restored to its original state by a process of "retrying";
3) the apparatus 1 may be restored to its original state by a Cyclic Redundancy Check (CRC) process;
4) the apparatus may be restored to its original state using an Error Correction Code (ECC);
5) the apparatus may be restored to its original state by writing data into a substitute sector; and
6) the apparatus is not restored to its original state.

For operations 1) through 5), it is possible to read out or reproduce the recorded data, and the respective operations can be continuously performed. Furthermore, it is possible to determine under which operation the magnetic-optic disk drive apparatus 1 is restored through the control of the host computer 2.

As prescribed in the IS&C standard specification (issued by the incorporated foundation "Medical Information System Development Center"), an IS&C Disk Format standard has a format/management system (zone system) independent of the operating system of the host computer.

The IS&C standard specification relates to recording of data, especially image data.

In order to assure the interchangeability between devices of different makers, various specifications are prescribed ranging from physical characteristic of the magneto-optic disk to file format, data format, etc. Since the application of the IS&C standard has advanced, in particular, with respect to recording data for use in medical treatment, it is predicted that magneto-optic disks may gain popularity, especially in the realm of medical treatment.

In general, a signal recorded in a magneto-optic disk is less reliable in comparison with a magnetic disk. As to the error rate of the magneto-optic disk, although the Byte Error Rate (BER) thereof is equal to or less than $10^{-3}$ for a new magneto-optic disk, the probability of an error occurring increases once the magneto-optic disk has been used.

In general, such a disk is unusable for the purpose of recording information because of the high error rate. Therefore, a Cyclic Redundancy Check (CRC) and/or an Error Correction Code (ECC) is used for increasing the reliability of the recorded data. Also, even when a portion of the signals recorded on a sector of the disk disappears, a remaining portion of the signals can be restored and the error rate after performing correction using the ECC is improved to a value not larger than 10.

When a sector is judged to be "not good", it is replaced by another sector designated for replacement operations.

In general, a signal recorded on a magneto-optic disk has a low reliability in comparison with a signal recorded on a conventional magnetic disk or the like. The BER (Byte Error Rate) of a new magneto-optic disk itself is usually equal to or less than $10^{-3}$. However, the probability of an error occurring increases in proportion with amount of use or elapsed use time of the magneto-optic disk.

Since a signal recorded on a magneto-optic disk increases the BER of the magneto-optic disk, CRC and ECC are used in order to enhance the reliability of the recorded data such that even when a portion of the signals recorded on various sectors of the disk is lost, it is possible to restore the lost portion of the signals. However, although CRC and ECC are effective techniques for enhancing the reliability of the data in each of the various sectors of a magneto-optic disk, it may be impossible to evaluate the reliability of the entire magneto-optic disk by only correcting errors sector by sector.

The BER of a new magneto-optic disk after applying an ECC decreases to $10^{-12}$. However, it has been confirmed that when the elapsed use time increases the BER deteriorates and the value of the BER increases and may become large. This indicates that the magneto-optic disk varies with the elapsed use time and the disk may eventually become unfit for recording information.

As mentioned above regarding the conventional apparatus, there does not yet exist an apparatus designed such that reliability of a magneto-optic disk with respect to elapsed use time-related disk variations, reliability of a magneto-optic disk drive apparatus 1, and reliability of an entire apparatus including the host computer 2 for controlling the magneto-optic disk drive apparatus 1 is evaluated, and a warning is given to the apparatus in accordance with the result of the evaluation, thus prompting a backup of the data to be made.

Although the logic format on a magneto-optic disk may be prescribed by the IS&C standard, there is no prescription relating to securing the data on the magneto-optic disk. Also, although the CRC and the ECC used for reducing the error rate are effective methods for increasing the reliability of the data for each sector of the magneto-optic disk, reliability cannot be evaluated by only considering the error correction of the specified sector.

Furthermore, a magneto-optic disk is inadequate for accumulating information over a long elapsed use time because the BER deteriorates and becomes large. It is only in the past several years that magneto-optic disks have been in practical use, and therefore measures for enhancing reliability as a function of elapsed use time have not been fully explored. According to an acceleration test (a type of reliability test), it has been confirmed that a magneto-optic disk can be preserved more than ten years under ordinary environmental conditions. However, at the present time, it is impossible to know the extent of the reliability thereof under special environmental conditions. In particular, for medical treatment data, for which utilization of the IS&C standard can be fully estimated, the minimum preservation time period (year-month-day) is legally determined. In some cases, preservation of 10 or more years may be required. Although it is essential to preserve the data during the period established by law, that period has not yet been determined at the present time.

SUMMARY OF THE INVENTION

In view of the above considerations, it is an object of the present invention to solve the aforementioned deficiencies.

It is another object of the present invention to evaluate reliability with respect to elapsed use time variations of the magneto-optic disk and of data recorded on the magneto-optic disk.

It is still another object of the present invention to provide a magneto-optic disk drive apparatus that preserves a magneto-optic disk over the usable years or lifetime of the disk.

It is still another object of the present invention to provide a magneto-optic disk drive controlling apparatus for controlling the magneto-optic disk drive apparatus for inserting and removing a magneto-optic disk by manual operation of a user's hands or by automatic transportation using a host computer. The controlling apparatus includes disk deterioration determining measure for determining a deterioration state of the magneto-optic disk, and alarm measure for issuing an alarm to perform data backup and to stop usage of the magneto-optic disk when the deterioration state of the disk exceeds a pre-set value.

It is still another object of the present invention to provide a file manager for issuing an alarm to the user in accordance with the deterioration state of the magneto-optic disk.

It is still another object of the present invention to provide a file manager for implementing an IS&C file format in the magneto-optic disk by performing an operation of reading/writing data on the magneto-optic disk in the magneto-optic disk drive apparatus using an execution program. The file manager includes disk deterioration state determining measure for determining a deterioration state of the magneto-optic disk, and alarm measure for issuing an alarm to the execution program to perform data backup and stop usage of the magneto-optic disk.

BRIEF DESCRIPTION OF THE DRAWINGS

FIGS. 18a–18c are explanatory diagrams illustrating principles of recording/reproducing for the magneto-optic disk device;

DETAILED DESCRIPTION OF THE PREFERRED EMBODIMENTS

Operating Principles of a Magneto-Optic Disk

Figure 14:
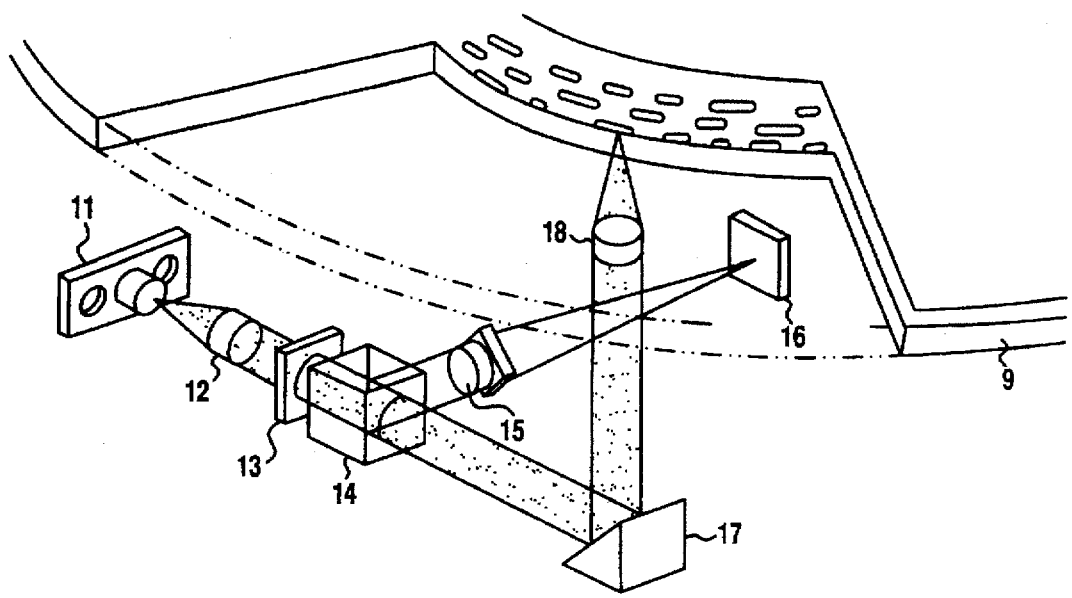
FIG. 14 is an explanatory diagram showing a construction of an optical disk head.
Figure 15:
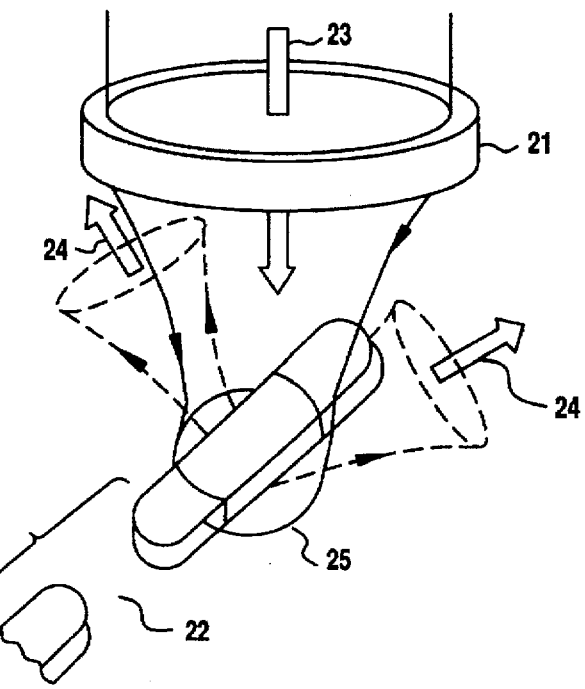
FIG. 15 is a diagram showing a principle of detection of a recorded signal.

FIG. 14 shows an example of a simple construction of an optical disk head system (optical pick-up) for use with optical disks such as compact disks (CDs). As shown in FIG. 14, the optical disk head system includes a light source 11 such as a semiconductor laser for emitting laser light rays, an optical system comprising a plurality of micro lenses 12, 15, 18, a diffraction grating 13, micro prisms 14 17, a light detector 16, and an actuator system for actuating the head (not shown in the figure). FIG. 15 shows a principle of detecting a signal recorded on a signal surface of an optical disk. Reference numerals 21, 22, 23, and 24 represent an objective lens 21, a pit 22, incident light rays 23, and diffracted light rays 24, respectively.

Figure 16:
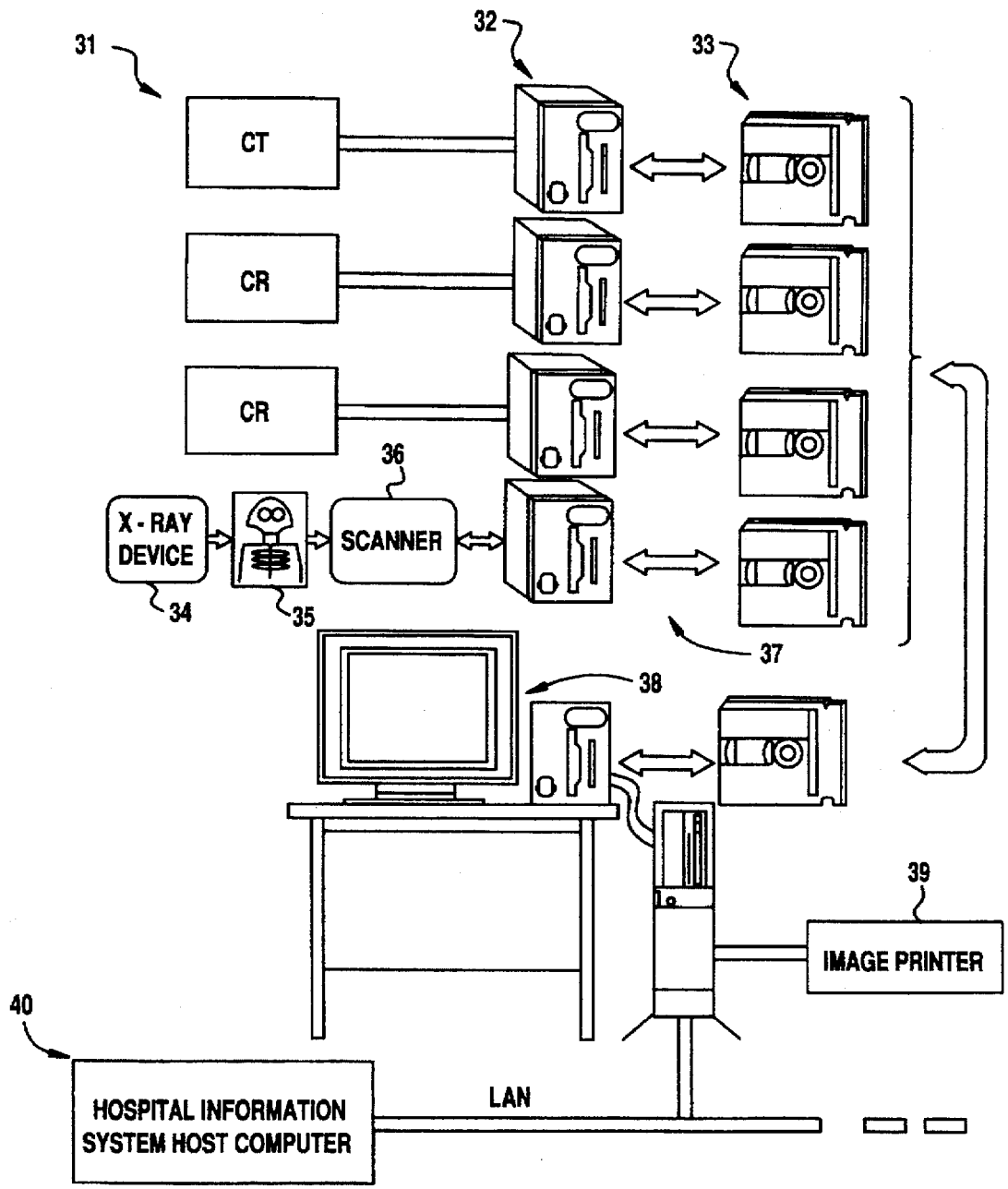
FIG. 16 is a diagram illustrating a disk drive system.

FIG. 16 schematically shows a magneto-optic disk drive system. The system includes controllers 31, drivers 32, disks 33, an X-Ray device 34, a film 35, a scanner a host machine 37, a work station 38, an image printer 39, and a host machine 40.

Figure 17:
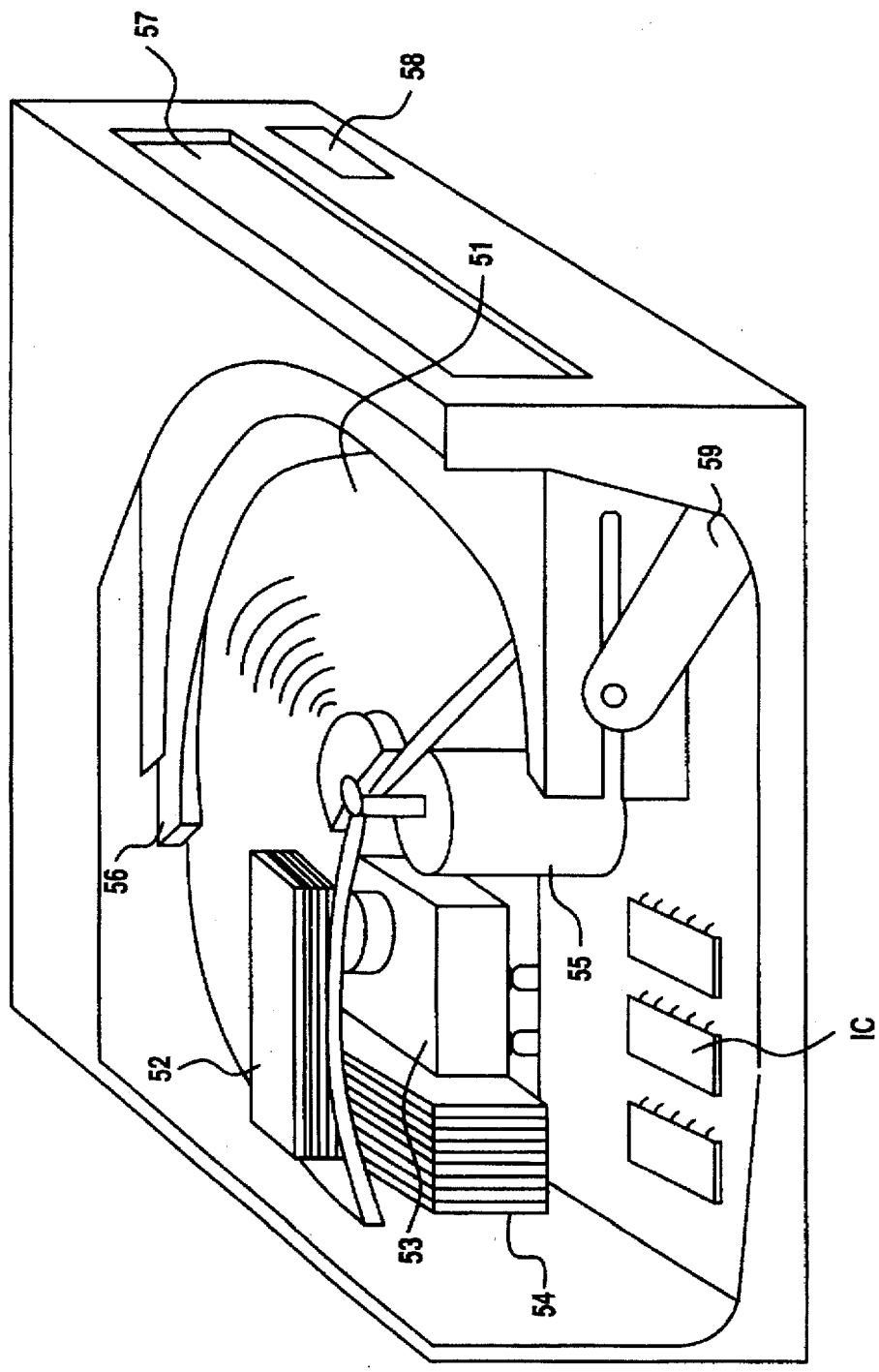
FIG. 17 is a diagram illustrating a magneto-optic disk device.

FIG. 17 is a perspective view showing a magneto-optic disk apparatus employed in the system of FIG. 16. In FIG. 17, a magneto-optic disk 51 accommodated within a cartridge 56 is engaged with a spindle of a motor (disk motor) 55 by action of a loading function and rotated by the motor 55 at a high speed. A magneto-optic disk head 53 for performing the operations of erasing, recording, and reproducing (verifying) moves just below the magneto-optic disk 51 in a radial direction by a linear motor 54. The disk head 53 moves to a predetermined sector position in order to access data required by the host machine.

The movement of the magneto-optic disk head 53 to the predetermined sector position is done by the cooperative action of the linear motor 54 for roughly positioning the head 53 and a tracking actuator included in the head for precisely positioning the head 53.

The magneto-optic disk head 53 is constructed to radiate the laser light rays through the objective lens onto a location to be accessed and performs the operations of erasing, recording, and reproducing (verifying) data.

Figure 18A:
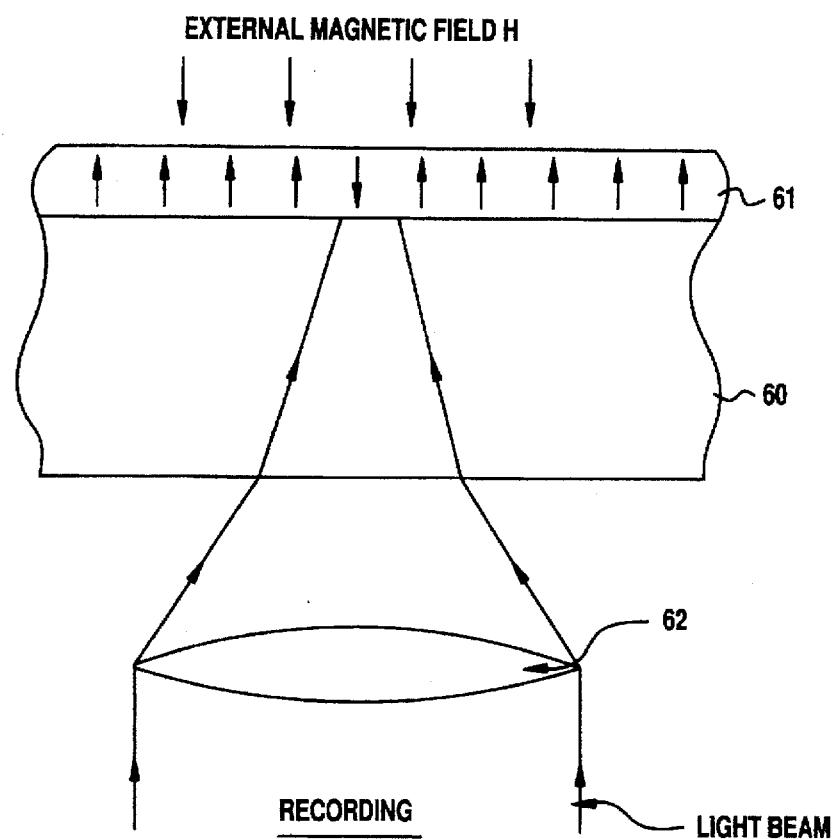
Figure 18B:
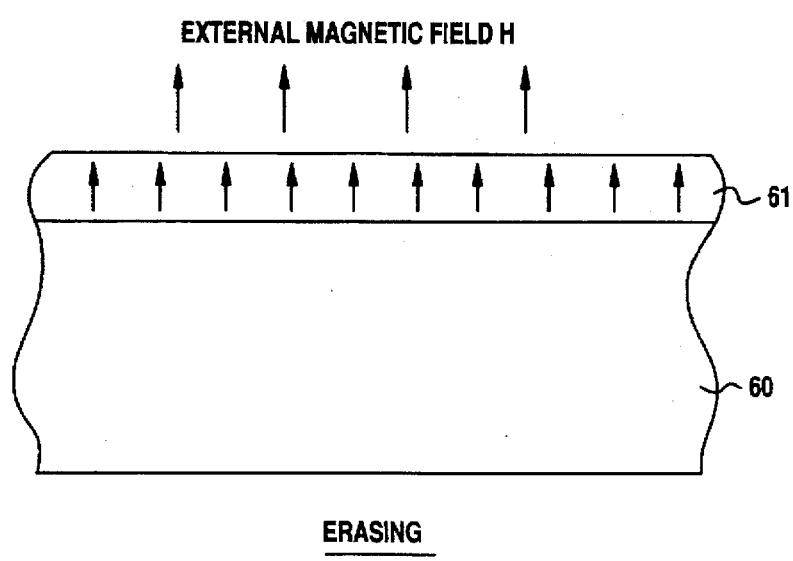

FIGS. 18a and 18b show a principle of recording/reproducing (verifying) data on a magneto-optic recording medium. In FIGS. 18a and 18b, reference numerals 60, 61, and 62 represent a substrate 60, a recording medium (vertically magnetized film) 61, and an objective lens 62, respectively. In FIG. 18c, reference numerals 63, 64, 65, 66, and 67 represent a recording medium (vertically magnetized film) 63, a focusing lens 64, a beam splitter 65, a light detecting element 66, and a light detector (photodetector) 67, respectively.

Laser light rays emitted from a laser diode LD are focused to a light spot of approximately 1 μm in diameter and radiated onto the magneto-optic recording medium 61, which is a vertically magnetized film to perform recording/reproducing (verifying) of data.

FIG. 18a shows a principle of recording. The recording is done by a method of writing-in above the Curie Point of the recording medium 61. As shown in FIG. 18a, the magneto-optic disk is applied with the external magnetic field H and heated with the light beam at the same time. The intensity of the laser light rays is modulated according to the information to be recorded and radiated onto the surface of the recording medium (recording film) 61 of the magneto-optic disk. When the laser light rays are modulated to produce a large output the recording medium (film) position receiving the spot of the laser light rays focused by the objective lens 62 is heated to a temperature greater than the Curie Point. If the temperature of the radiated portion of the recording film 61 exceeds the Curie Point, the radiated portion of the recording film 61 is magnetized to have the same direction as the external magnetic field H.

During recording, the magneto-optic medium 61 is rotating, and when the recording film 61 departs from the location of the light spot, or radiated spot, the temperature of the recording film drops rapidly. Even when the temperature of the recording film 61 cools to lower than the Curie Point, the recording film 61 remains in a magnetized state having the direction of the external magnetic field H. In such manner, data are recorded on the recording medium 61.

The operation of recording is performed according to the sequence of erasing, recording and reproducing (verifying). Before recording, the entire area of the medium 61 is uniformly and constantly magnetized in an upward direction to have the same direction as the external magnetic field H by an erasing operation, which is described later. During recording, the direction of the magnetic field H is reversed and becomes downward. The light beam corresponding to the information signal to be recorded is then focused onto the medium 61 through the objective lens 62.

Assuming that the binary image signal is "1" and the corresponding light intensity is also "1" (strong), the temperature of the medium 51 receiving the light spot exceeds the Curie Point. At this time, the direction of its magnetization is reversed, namely, it becomes directed downward, as shown in FIG. 18a. Even when the light spot departs from that position, the magnetized state does not change. On the other hand, assuming that the binary image signal is "0" and the corresponding light intensity is "0" (weak), the temperature of the medium 61 receiving the light spot does not exceed the Curie Point. Therefore a reversal of its magnetization direction does not occur.

FIG. 18b shows a principle of erasing, which is similar to that of recording. They major difference is that the intensity modulation of the LD produces a constant large output during the erasing period and the direction of the external magnetic field is reversed.

As shown in FIG. 18b, the medium 61 heated to a temperature exceeding the Curie Point is uniformly and constantly magnetized in an upward direction, which is the same as the direction of the external magnetic field H.

At this time, all information is erased. Even though the temperature of the medium 61 cools to below the Curie Point, the medium 61 maintains the upward magnetization.

FIG. 18c shows a principle of reproducing (verifying) by use of the Kerr effect. As shown in FIG. 18c, the direction of the vertical magnetization of portions of the recording film 63 are "upward" or "downward" in accordance with the recording signal, that is, "0's" or "1's".

When reproducing (verifying) data, if the linearly deflected light spot is radiated on the recorded portion (recording film) 63 through the focusing lens the deflecting direction of the light spot varies in accordance with the direction of magnetization of the recording film, and the variation in the deflecting direction is converted to an intensity-modulated electrical output signal using the light detecting element 66 and the light detector (photodetector) 67. A relationship between the polarizing direction of the deflected light rays with respect to the recording and non-recording areas and the Kerr revolution angle is shown in FIG. 18c.

In regard to maintaining the light spot on the recording surface (film) 61, referred to herein as "pursuit", since the track pitch of the magneto-optic disk is very small, for instance, 1.6 μm, the light spot may deviate from the recording track because of the eccentricity and the surface vibration of the disk. Therefore, when recording data on a predetermined track or reproducing (verifying) the data on the predetermined track, it is necessary to cause the light spot to pursue the recording track by use of a tracking servo mechanism and a focus servo mechanism.

Figure 19:
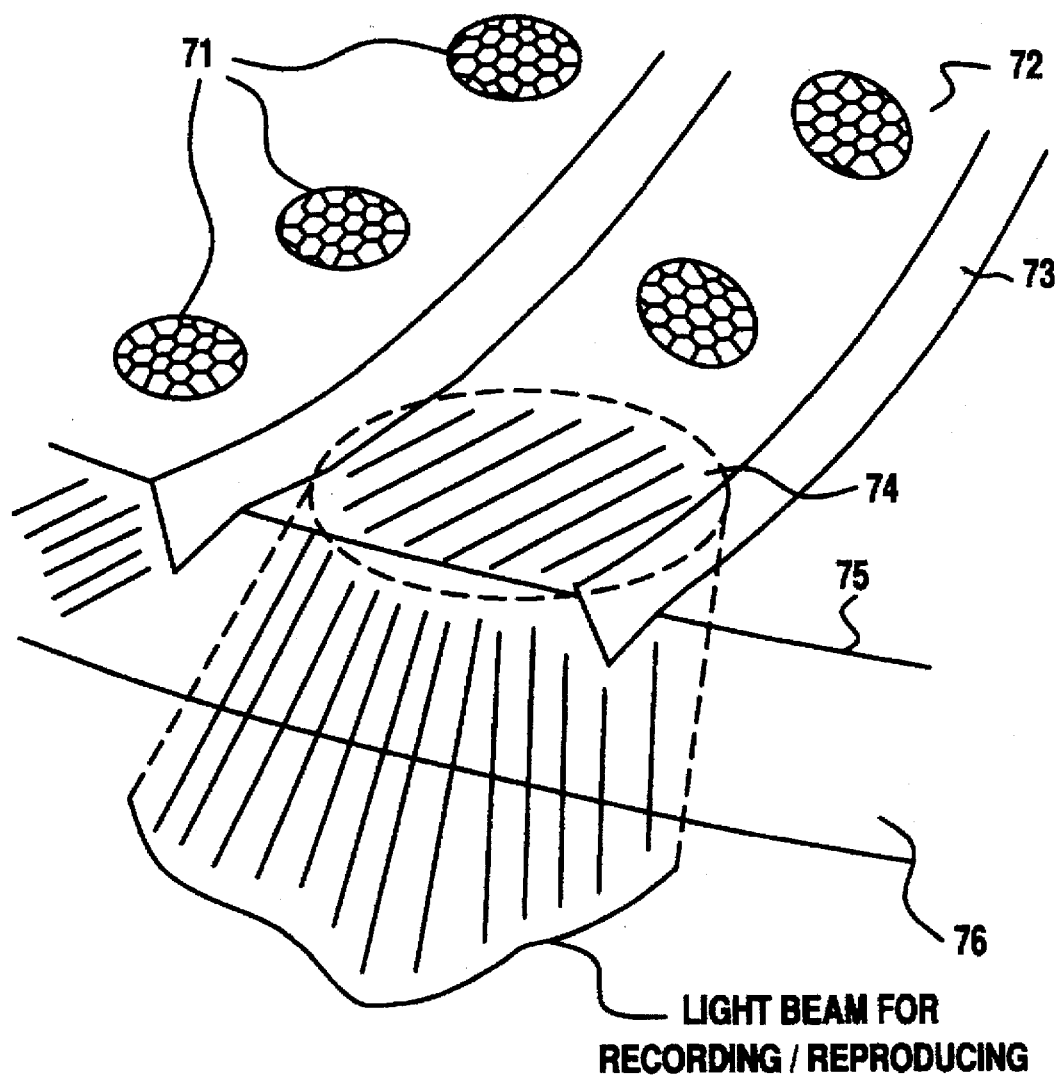
FIG. 19 is a diagram showing a successive servo system of the magneto-optic disk.

FIG. 19 shows a principle of a servo system for a magneto-optic disk drive system. In FIG. 19, reference numerals 71, 72, 73, 74, 75, 76, and 77 represent recording data 71, a land yortion 72, a tracking guide groove 73, a light spot 74, a recording film 75, and a substrate 76, respectively.

A groove 73, known as a "Tracking Guide Groove", is formed in a spiral configuration at an interval of 1.6 μm on they substrate 76. The land portion 72 is situated between adjacent grooves. FIG. 19 shows an enlarged view of the tracking guide groove 73 and the land portion 72. The recording data 71 are recorded on the recording film 75 on the land portion 72.

The pursuit of the light spot is performed on the land portion 72. When the light spot deviates from the center of the land portion 72, the reflected light rays become uneven in the right and left radial directions due to effects caused by the guide groove 73. Such unevenness is detected by detectors having two portions, and an error signal of the tracking servo mechanism is created by taking a differential signal of the output signals of the respective detectors. According to such a construction, it is possible to cause the light spot to pursue the movement of the land portion 72 by energizing an actuator for actuating the objective lens using the error signal of the tracking servo mechanism, which is created as mentioned above.

Figure 20:
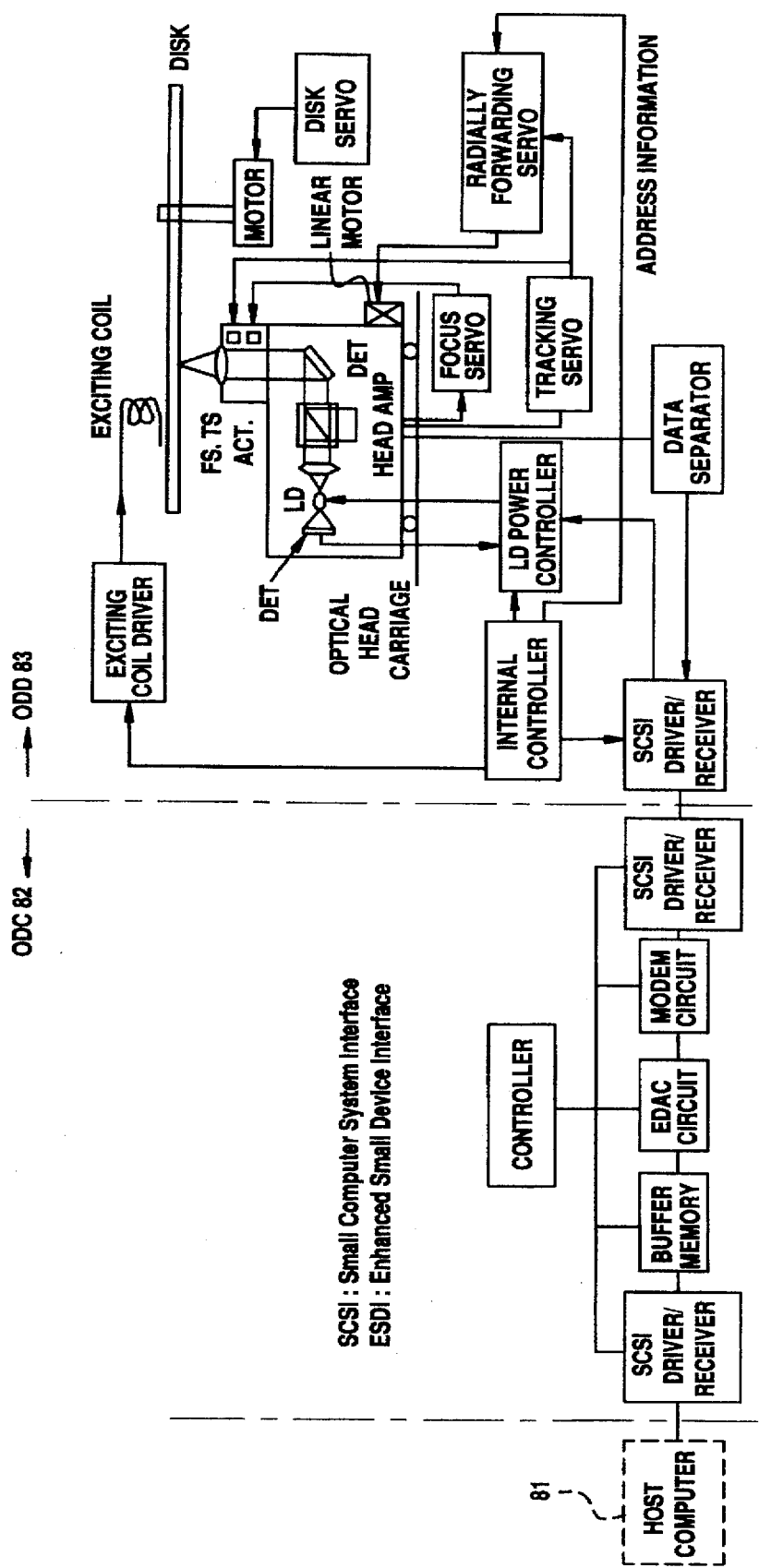
FIG. 20 is a block diagram schematically showing an example of a circuit construction of an entire magneto-optic disk device system.

FIG. 20 is a block diagram showing an example of a circuit construction of an entire magneto-optic disk drive system. The system includes a host computer 81, a magneto-optic disk controller (MODC) 8, and a magneto-optic disk drive (MODD) 83.

Information data transmitted through the SCSI (Small Computer System interface) bus 90 from the host machine (host computer) 81 has added thereto a check byte by an EDAC (Error Detection And Correction) circuit 92. The information data with the added check byte is converted to recording data by the modulation/demodulation circuit 94.

In accordance with the afore-mentioned recording principle, the LD (Laser Diode) light rays are intensity-modulated based on the recording data, and the modulated data are recorded on the magneto-optic disk. For reproducing (verifying) data, an inverse operation to that of recording is done. Namely, the reproduced data read out by the magneto-optic disk head is converted to the information data with the error correcting code by the modulating/demodulating circuit 94. After correcting for errors using the EDAC (Error Detection And Correction) circuit 92, the information data are transmitted to the host machine (host computer) 81 through the SCSI bus.

Preferred embodiments of the present invention are described below with reference to the accompanying drawings, in which like reference numerals represent the same or similar elements.

Figure 13:
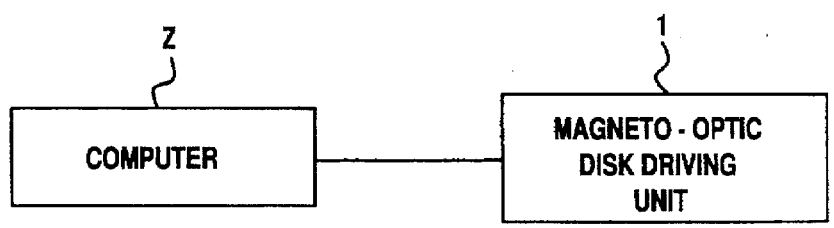
FIG. 13 is a block diagram showing a prior-art construction.

According to a first embodiment of the present invention, a magneto-optic disk drive controlling apparatus controls a magneto-optic disk drive apparatus 1 for inserting and removing a magneto-optic disk by manual operation or by automatic transportation using a host computer 2, as shown in FIG. 13. The magneto-optic disk controlling apparatus includes a disk deterioration determining measure for determining a deterioration state of the magneto-optic disk, and a disk deterioration tolerance excess warning measure for emitting a backup signal to perform data backup and a warning signal to stop usage of the magneto-optic disk when the determined deterioration state exceeds a tolerance range.

Figure 1:
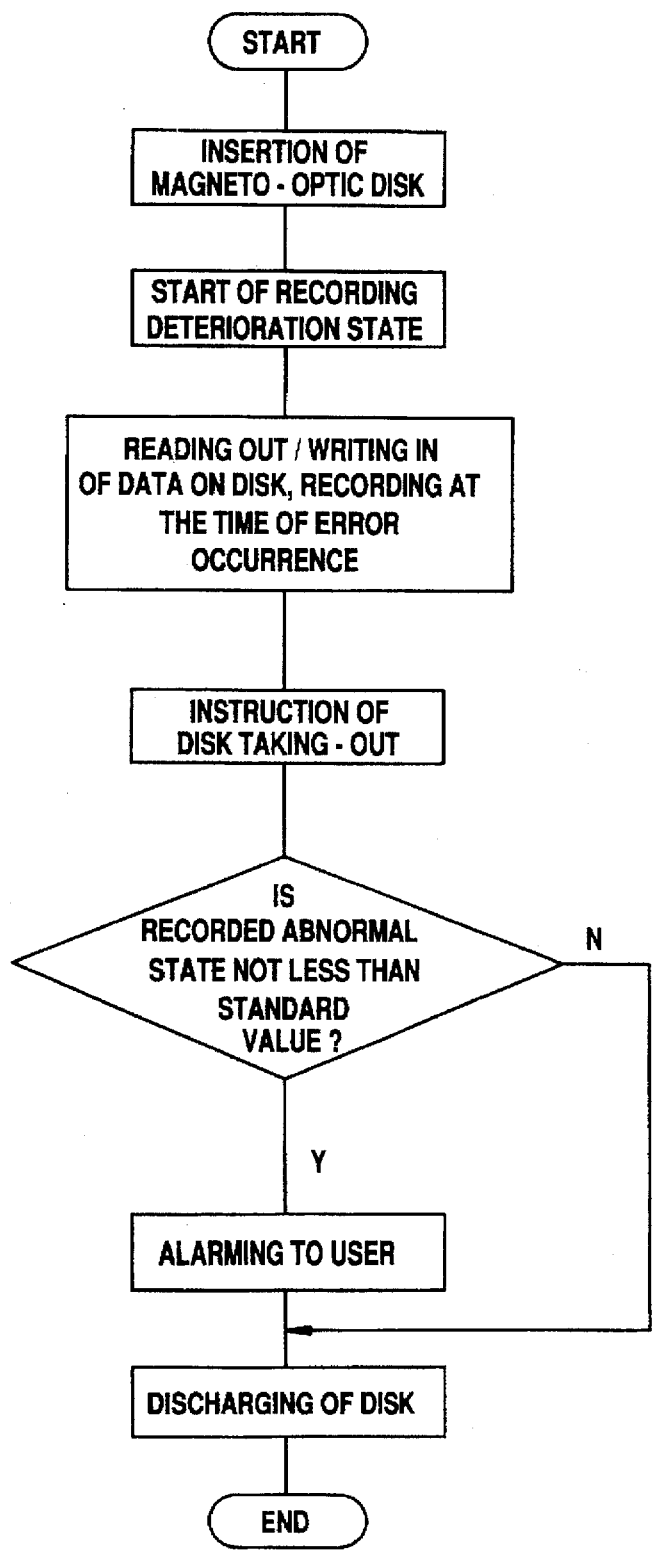
FIG. 1 is a flow chart according to a first embodiment of the present invention.

A processing method for the disk deterioration determining measure and the disk deterioration tolerance excess warning measure is outlined in the flow chart of FIG. 1.

First, the user inserts a [nessary] magneto-optic disk (referred to as "disk" hereinafter) into the magneto-optic disk drive apparatus 1 (referred to as "[driving] drive apparatus" hereinafter).

Next, data on the disk are read out and written in the drive apparatus 1 using the host computer 2, and the deterioration state thereof is recorded at the same time. During reading-out/writing-in of the data, an abnormal state 3), in which the apparatus 1 is restored to its original state with a CRC, through 6), in which the apparatus 1 cannot be restored, may occur and therefore the abnormal state is recorded in the drive apparatus 1.

The removal of the disk from the disk drive apparatus 1 is performed using specific software. Because the abnormal state of the disk is recorded the disk is evaluated by the software for removal of the disk. When the abnormal state exceeds a previously established standard (the deterioration tolerance range), since the usable number of years or usable lifetime is approaching expiration for the disk, backup of the data on the disk is performed and the drive controlling apparatus emits a warning to the user to cease usage of the disk immediately.

As described heretofore, in case that the extent of the disk's deterioration state exceeds the area of the deterioration tolerance, the drive controlling apparatus can emit a warning to the user of the disk.

Thereafter, the user performs suitable subsequent actions, such as backing up of the data, and thereby the data can be preserved over the useful lifetime of the magneto-optic disk. Consequently, the reliability of the data can be enhanced.

A second embodiment of the present invention is explained below, with reference to FIG. 2. When the deterioration of the disk proceeds at a constant rate, a proper measure can be taken for preventing such deterioration according to the first embodiment. However, in some circumstances the deterioration of the disk accelerates after a period of constant deterioration rate. For this reason, even if evaluation results show that the reliability of the disk is within a prescribed standard level, it is nevertheless important to give a warning to users in case the deterioration rate changes rapidly. In order to recognize such rapid changes, it is necessary to periodically perform reliability evaluations and record the disk's deterioration state history.

According to the present embodiment, in the optical disk drive controlling apparatus described in the first embodiment includes disk recognizing measure for recognizing respective disks, disk deterioration recording measure for recording each disk's deterioration state history, and respective disk deterioration alarm measure for issuing an alarm based on a recorded deterioration state.

Figure 2:
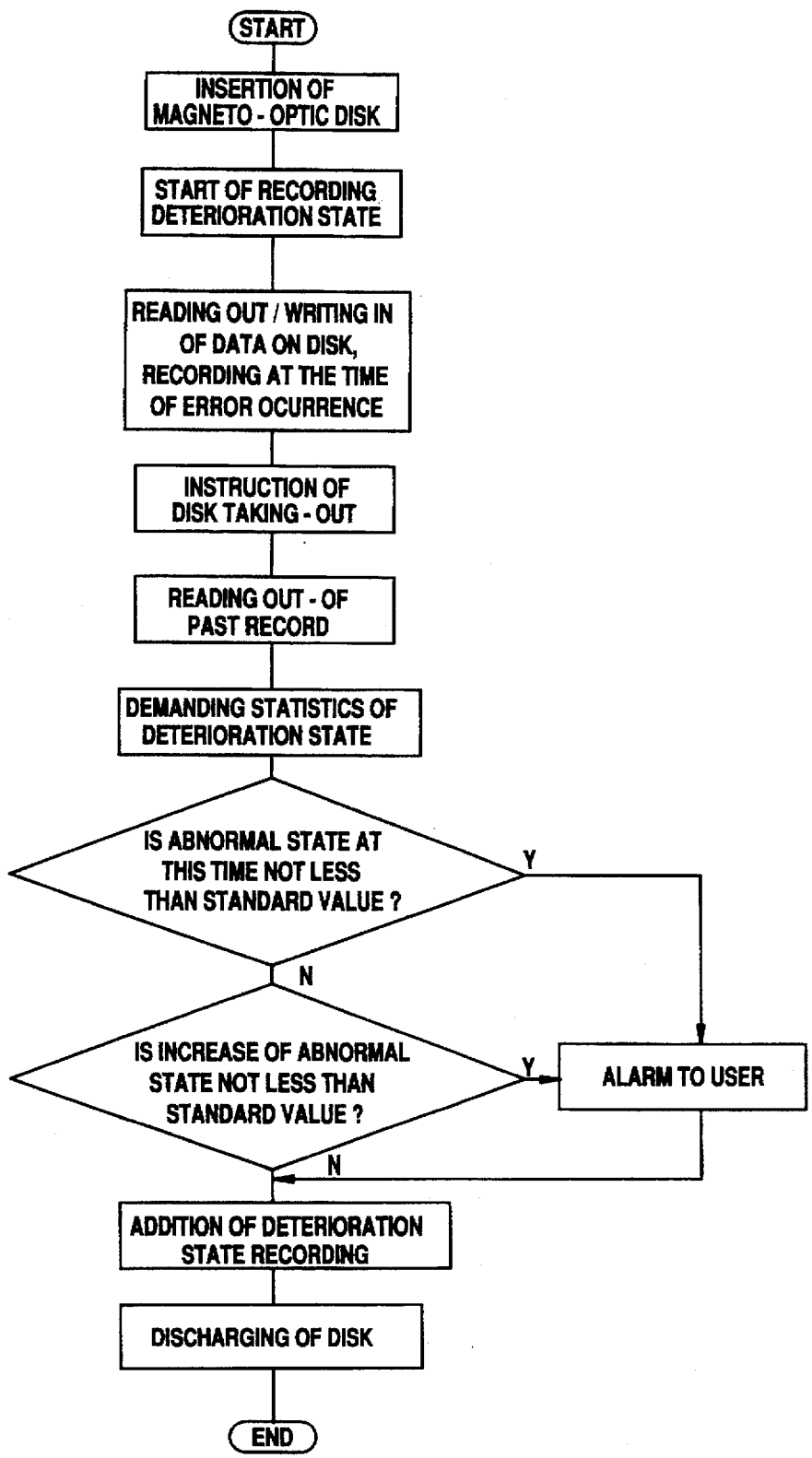
FIG. 2 is a flow chart according to a second embodiment of the present invention.

A method of using the disk recognizing measure, the disk deterioration recording measure, and the disk deterioration alarm measure is described in the flow chart of FIG. 2.

First, numerals or names are attached to the respective disks by the host computer 2 so that the disks may be individually recognized. The drive controlling apparatus according to the present invention controls the respective disks using the numerals or names thereof.

Next, each time the respective disks are utilized, an abnormal state of the disks is recorded in the controlling device, as in the case of the first embodiment, and then a deterioration state of the disks is summed up and recorded at a predetermined time interval of, for instance, one week or one month. When the disk's abnormal state exceeds a predetermined standard level, or an accumulated number of abnormal occurrences exceeds a predetermined number, the apparatus issues an alarm signal to warn users that usable lifetime of the disk is approaching expiration so the users should backup data recorded on the disk and immediately stop using the disk.

When the abnormal state of the disk and the extent thereof exceeds the standard level, the alarm signal is emitted based on the disk's deterioration state, and thereby any rapid changes can be recognized even if the disk's evaluated reliability changes rapidly but within the prescribed standard level.

The second embodiment may be used to obtain the same functional effect as that of the first embodiment.

A third embodiment of the present invention is explained below. The explanation of the same parts as those of the first embodiments is omitted.

A feature of the disk is that it is a transportable medium. For a computer system that is not connected to a network of other computers systems, it is possible to share data with other computer systems by transporting the data using a disk. If the disk is always used in the same computer system, the second embodiment can be used to process the proper disk evaluation treatment. However, if the disk is utilized in a plurality of different computer systems, the second embodiment may not be sufficient for evaluating the disk because each computer system may have certain features that may not readily be recognized or determined by other computer systems.

According to the third embodiment, respective features corresponding to respective disk drive controlling apparatuses in which the disk is used are recorded on the disk itself. In the third embodiment, the optical disk drive controlling apparatus described in the first embodiment further includes a disk deterioration recording measure for recording the historical progress of the disk's deterioration state, and a disk deterioration alarm measure for emitting an alarm signal based on the disk's deterioration state.

A method of using the disk deterioration recording measure and the disk deterioration alarm measure is described below and is similar to the method of the second embodiment.

First, for each respective disk, each time a disk is used, an abnormal state is recorded, such as in the first embodiment. The recorded abnormal states are accumulated and recorded in the disk at a predetermined time interval of, for instance, one week or one month. When the disk's abnormal state exceeds a previously established standard value, or when an accumulated number of abnormal occurrences exceeds a predetermined number, the drive controlling apparatus emits the alarm signal to warn users that the usable lifetime of the disk is approaching expiration and the users should make a backup of the data recorded on the disk and immediately stop using the disk.

When an abnormal state occurs and the extent thereof exceeds the standard value, the alarm signal is emitted based on the disk's deterioration state, and even when the disk is used in a plurality of different computer systems it is possible to determine the state of certain features for each of the plurality of different computer systems. Consequently, the reliability of the recorded data can be considerably enhanced. In addition, the same functional effects as described for the first embodiment may be obtained.

According to a tenth embodiment of the present invention, a portion of each respective disk is treated as a volume for recording the historical progress of the disk's deterioration state. Usually, in order to utilize the disk effectively, all of the volumes of the disk are controlled by a filing system of the host computer 2. The status of the volumes can easily be read out and written in by the host computer 2, which treats the status of the volumes as part of the file structure of the disk. Therefore, a method of recording the historical progress of the disk's abnormal state into one of the files of the disk can be easily realized.

A feature of this embodiment is the optical disk drive controlling apparatus, as described in connection with the third embodiment, further comprises a system's inside area recording measure for recording within a filing system of the disk controlling apparatus the historical progress of the disk's deterioration state therein. Accordingly, the historical progress of the disk's deterioration state is recorded into one of the filing systems of the disk controlling apparatus.

According to an eleventh embodiment of the present invention, if the disk's deterioration state history is recorded as a regular file, there is a danger of the history file being erased by an error on the part of the user. In order to preserve the recorded history file of the disk, it is necessary to minimize the danger of erasing the history file.

Therefore, it is necessary to identify a recording area that cannot be used in the filing system. Specifically, a feature of this embodiment is the optical disk drive controlling apparatus, as described in the third embodiment, further comprises a a recording area for recording the disk's deterioration state history, with the recording area being outside the regular filing system area of the controlling apparatus.

A method of recording the disk's deterioration state history in the recording area outside of the regular filing system area is described below. The respective volumes of the disk are usually initialized as the filing system by the host computer 2. When the disk is initialized, not all areas of the respective volumes are utilized by the filing system, and some areas are not used as part of the filing system. The deterioration state history is recorded in an area not used as part of the filing system. Therefore, the danger of erasing the recorded abnormal state history as a result of user error is reduced.

Figure 3:
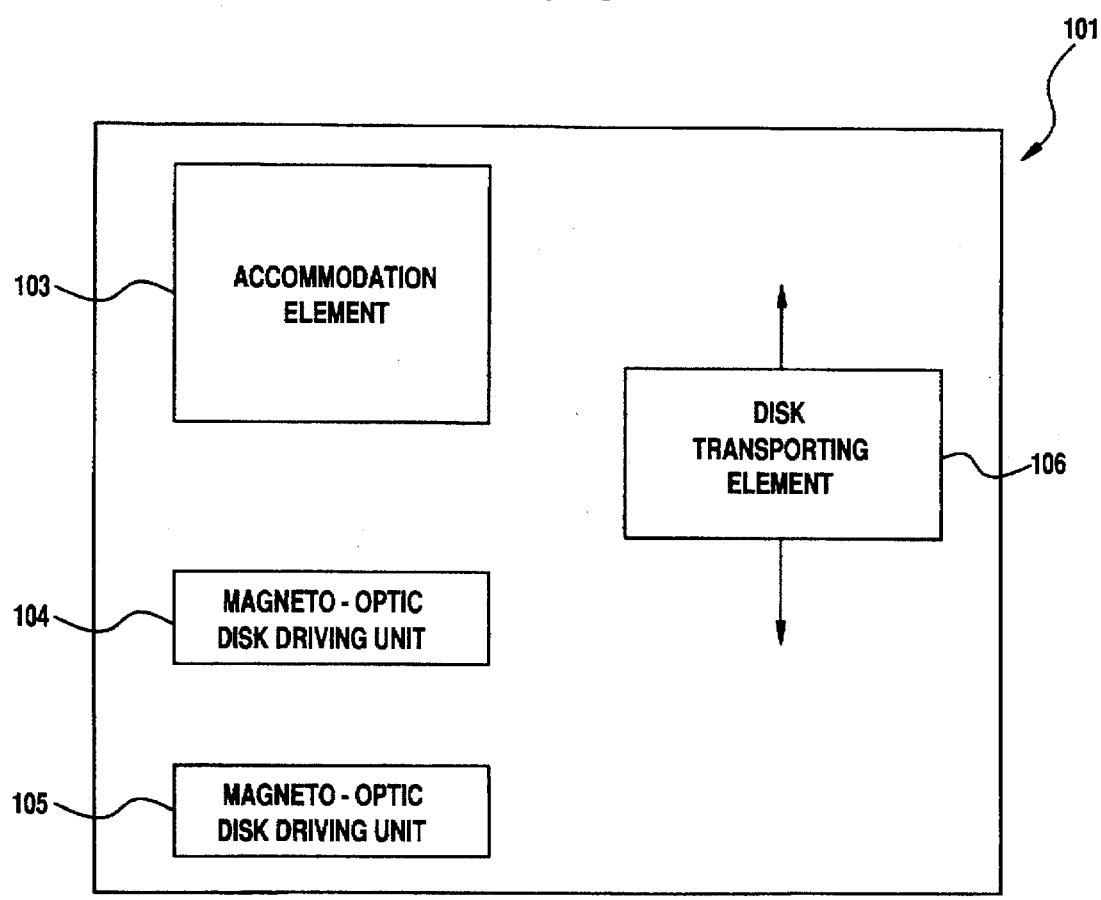
FIG. 3 is a schematic block diagram showing a library unit according to a fourth embodiment of the present invention.
Figure 4:
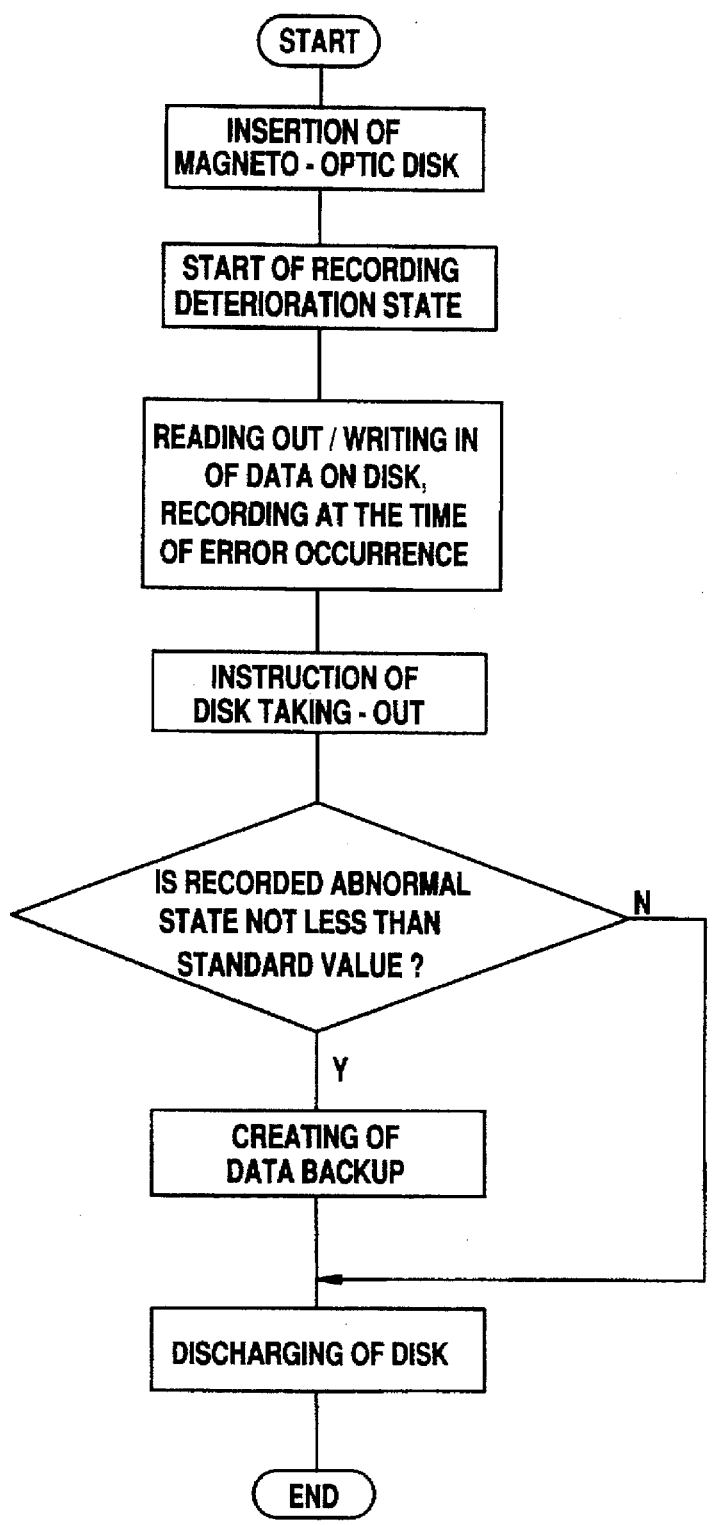
FIG. 4 is a flow chart according to the fourth embodiment of the present invention.

According to a fourth embodiment, shown in FIGS. 3 and 4 the magneto-optic disk drive controlling apparatus includes the drive apparatus 1 for inserting and removing the disk by manual operation or by automatic transportation controlled by the host computer 2. The disk drive controlling apparatus includes a disk deterioration determining measure for determining the disk's deterioration state, and a disk deterioration tolerance excess data backup measure for automatically creating a backup copy of the data on another disk when the extent of disk deterioration state exceeds a deterioration tolerance range.

Operation of the disk deterioration determining measure and the disk deterioration tolerance excess data backup measure is shown in the flow chart of FIG. 4. The drive apparatus 1 may include a single drive unit or it may be a library-type apparatus with a plurality of drive units for inserting and removing a plurality of disks using a control mechanism that does not require manual operation. FIG. 3 is a block diagram of the library-type drive apparatus. In FIG. 3, the drive apparatus 101 includes an accommodation unit 103, magneto-optic disk drives 104 and 105, and a disk transporting element 106.

When a disk is inserted into a designated drive apparatus 1 commanded by the host computer 2, the operation of reading out and writing of data from and to the disk is performed by the drive apparatus 1 controlled by the host computer 2. When an abnormal phenomenon occurs on the disk, the abnormal state is recorded in the apparatus. When the abnormal state exceeds a previously established standard level, the data on the disk is saved on another disk set aside in the library for this purpose.

A number of methods exist for saving the data on another disk. One method is to make a complete copy of the disk on an unused disk. Another method is to first record the data in various dispersed vacant areas of the other disk and inform the user of the above matter. If necessary, the user inserts a new disk into the library unit, and the data saved on the other disk is transferred to the new disk in a single bundle.

As described above, when the disk deterioration exceeds the tolerance range, the controlling apparatus automatically creates a backup of the data, thereby making it possible to preserve the data over the the usable lifetime of the disk. Consequently, the reliability of the data is enhanced.

Figure 5:
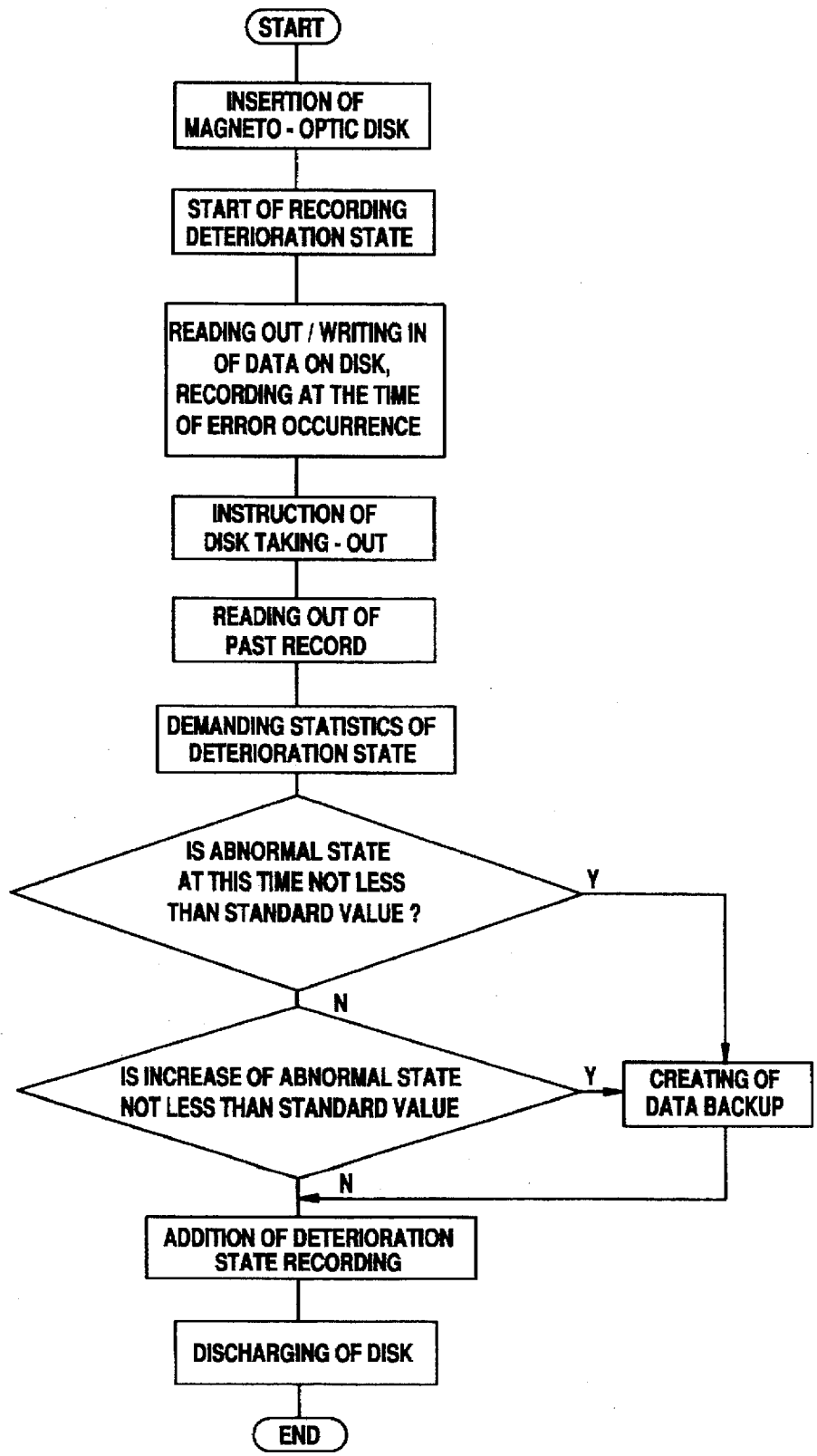
FIG. 5 is a flow chart according to a fifth embodiment of the present invention.

A fifth embodiment, shown in the flow chart of FIG. 5, deals with the rapid or accelerated disk deterioration that sometimes occurs, as described above with respect to the second embodiment. In order to recognize the accelerated disk deterioration, it is necessary to periodically evaluate the disk's reliability and record the historical progress of its deterioration.

In this embodiment, the optical disk drive controlling apparatus described of the fourth embodiment further comprises a disk recognizing measure for recognizing each of the respective disks, a disk deterioration recording measure for recording the historical progress of the disk's deterioration state in the controlling apparatus, and a disk deterioration data backup creating measure for automatically creating a backup of the data on the disk to another disk based on the recorded historical progress of the deterioration state of the disk.

A method of using the disk recognizing measure, the disk deterioration recording measure, and the disk deterioration data backup creating measure is described below with reference to the flow chart of FIG. 5. First, identifying numbers (numerals) and names are attached to each of the respective disks in order for the host computer 2 to be able to recognize the respective disks. The apparatus controls the respective disks in accordance with those numbers and names. Each time the respective disks are utilized, the abnormal state is recorded in the apparatus, such as described above with respect to the fourth embodiment, and the abnormal state history is summed up and recorded at each predetermined time interval of one week or one month, for example. When the disk's abnormal state exceeds the predetermined standard level, or even if the abnormal state does not exceed the predetermined standard level, but the sum value shows an increase in the rate of abnormal state occurrence and exceeds the standard value thereof, the data on the disk is saved on another disk set aside in the library for this purpose. In such a manner, a backup of the data is created. Therefore, even when the reliability of the disk is evaluated to be rapidly deteriorating but within the prescribed standard level, the rapid changes in the deterioration state can be recognized. Consequently, the reliability of data recorded on the disk is increased. Moreover, the fifth embodiment achieves the same functional effects as does the fourth-embodiment.

When a disk is utilized in a plurality of different computer systems, the abnormal state of the disk in each of the systems cannot be determined. Therefore, according to a sixth embodiment, the disk deterioration state determined by the respective controlling apparatuses utilizing the disk is recorded on the disk itself. Namely, this embodiment relates to the magneto-optic disk drive controlling apparatus, described in the fourth embodiment, and further comprises a disk deterioration recording measure for recording the historical progress of the disk deterioration state on the disk, and a disk deterioration data backup creating measure for automatically creating a backup of the data on the other disk based on the recorded deterioration state.

A method using the disk deterioration recording measure and the disk deterioration data backup creating measure is described with reference to the flow chart of FIG. 5. When each of the respective disks are utilized, the respective abnormal states are recorded in the apparatus, and the respective abnormal states are summed up and recorded at each predetermined time interval of one week or one month, for example. If a disk's abnormal state exceeds the previously established standard level, or even if the abnormal state does not exceed the standard level, but the sum value shows an increase in the rate of abnormal state occurrence, the data on the disk is saved on another disk set aside in the library for this purpose, and a backup of the data is thus created. When an abnormal state occurs on the disk and the abnormal state exceeds the standard level, a backup of the data is created on another disk, and even when the disk is utilized in a plurality of different computer systems, the abnormal state of the disk can be determined by each of the systems. Therefore, the reliability of the data is considerably enhanced. The tenth and eleventh embodiments discussed above can be applied to the sixth embodiment. The recording measure of the disk controlling apparatus is used to record the disk's abnormal state in one of the files of the filing system.

With respect to the eleventh embodiment described above the recording measure records in an area outside of the regular filing system and the historical progress of the abnormal state is recorded in that area. Therefore, the danger of erasing the abnormal state history due to user error is avoided.

Figure 6:
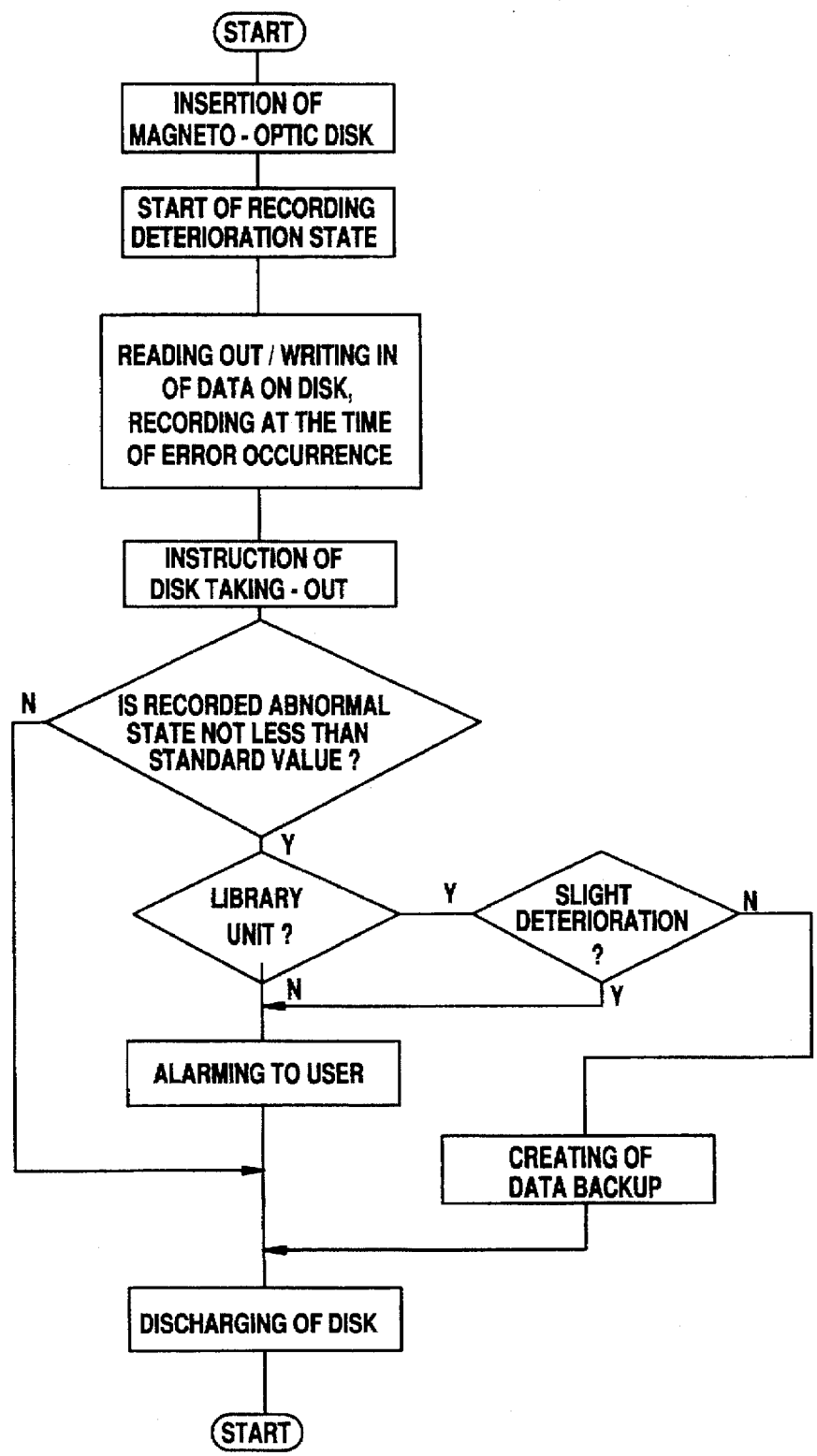
FIG. 6 is a flow chart according to a seventh embodiment of the present invention.

According to a seventh embodiment, a flow chart for which is shown in FIG. 6, a magneto-optic disk drive controlling apparatus 1 for inserting and removing a disk by manual operation or by automatic transportation is controlled by a host computer 2. The apparatus 1 can perform a disk deterioration determination measure for determining the disk deterioration state and a disk deterioration tolerance excess warning and data backup creating measure for giving a warning signal to alert a user in accordance with the deterioration state when the determined deterioration state exceeds a predetermined deterioration tolerance range or for automatically creating a backup of the data on another disk.

A method of using the disk deterioration determining measure and the disk deterioration tolerance excess warning and data backup creating measure is described below with reference to the flow chart of FIG. 6. The operation from and to the disk is performed by the driving apparatus 1 controlled by the host computer 2. When an abnormal state occurs on the disk, the abnormal state is recorded in the apparatus. When the disk is removed from the driving apparatus 1, the abnormal state for the time period from insertion of the disk through recording of data on the disk is evaluated in the apparatus. If the disk's abnormal state exceeds a previously established standard level, the following actions may be taken. If the disk is not used in a library-type unit a warning signal is given to the user. On the other hand, if the disk is used in a library-type unit a warning signal is given to the user when the extent of disk deterioration is comparatively small, and the data is saved to another disk in the library when the extent of disk deterioration is significant. There are two methods of saving the data: forming a copy on an unused disk previously set aside for that purpose, and copying the data into a vacant area of another disk as an immediate measure and reconstructing the data on a new disk when available. Therefore, when the extent of disk deterioration exceeds the tolerance range, the controlling apparatus gives a warning signal to the user, or a backup of the data is created automatically. Thereby, the data can be preserved over the usable lifetime of the disk and the reliability of the data is assured.

Figure 7:
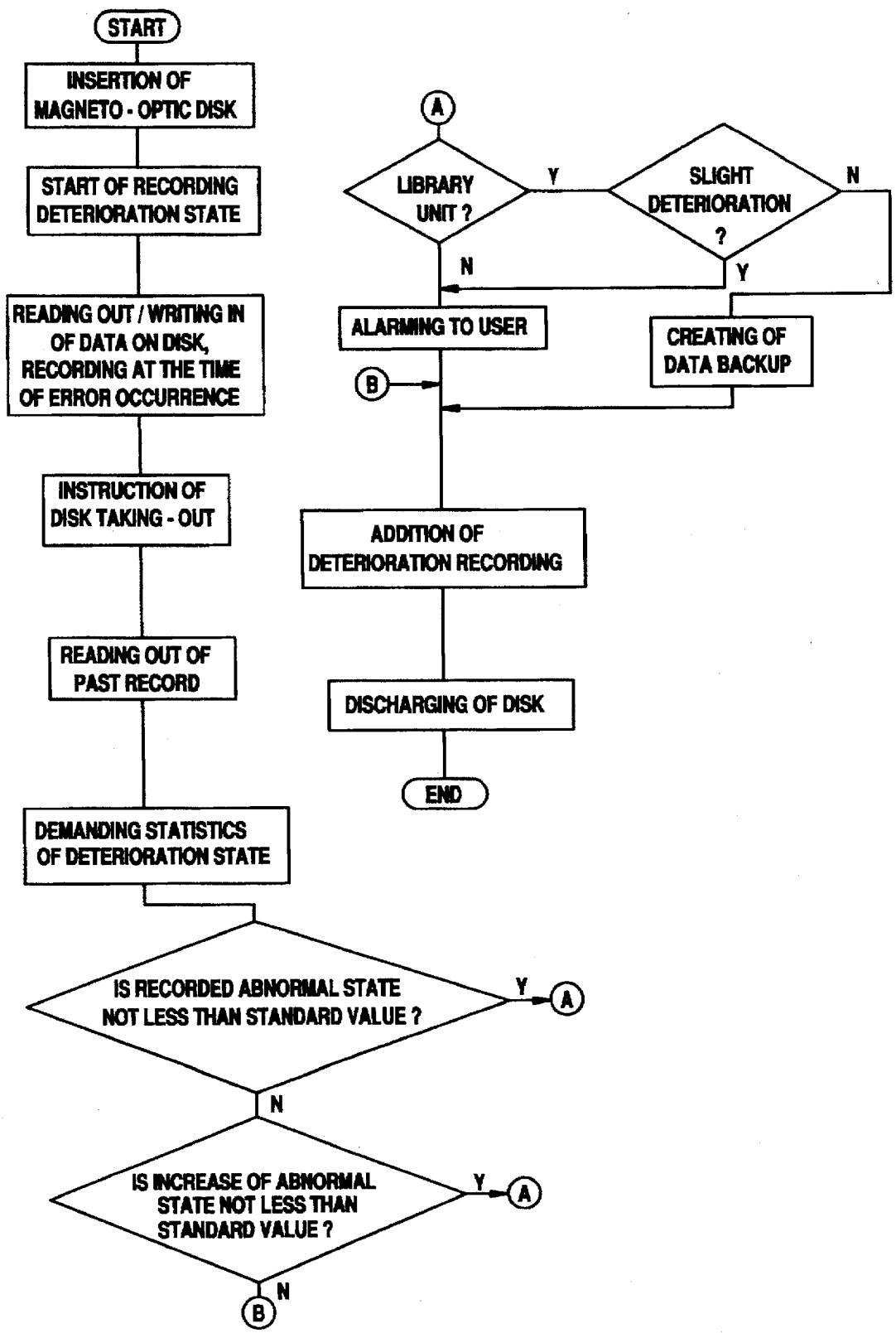
FIG. 7 is a flow chart according to an eighth embodiment of the present invention.

FIG. 7 is a flow chart for an eight embodiment of the present invention.

As discussed in connection with the second embodiment, it is important to be able to cope with an accelerated rate of disk deterioration that sometimes occurs. In order to recognize and detect an accelerated disk deterioration rate, it is necessary to periodically evaluate disk reliability and record the historical progress of the disk deterioration state.

According to this embodiment, the magneto-optic disk drive controlling apparatus includes a disk recognizing apparatus for recognizing each of a plurality of disks, a disk deterioration recording measure for recording historical progress of the deterioration state of a recognized disk in the controlling apparatus, and a disk deterioration alarm and data backup creating measure for giving a warning signal to a user based on the recorded content of the historical progress of the deterioration state or automatically creating a backup of data from the disk to another magneto-optic disk.

A method of using the disk recognizing measure, the disk deterioration recording measure, and the disk deterioration alarm and data backup creating measure is described below in accordance with the flow chart of FIG. 7.

Identification numbers and names are given to each of the plurality of disks in order for the host computer 2 to be able to recognize the respective disks. The apparatus controls the respective disks based upon the identification numbers and names. Each time one of the respective disks is utilized, its abnormal state is recorded in the apparatus, as in the case of the seventh embodiment, and the abnormal state is periodically determined and accumulated with the disk's deterioration state history, and the abnormal state is recorded at a predetermined periodic time interval of one week or one month, for example. When the disk's abnormal state exceeds a previously established standard level, or even if the disk's abnormal state does not exceed the standard level but the abnormal state indicates an accelerated disk deterioration rate that exceeds the standard level, data on the disk is saved onto another disk set aside in the library for such a purpose, or the controlling apparatus gives a warning signal to a user of the disk.

Therefore, even when an evaluation of the disk's reliability shows a rapid rate of disk deterioration that is within the predetermined standard level, the rapid deterioration rate is recognized so that appropriate actions can be taken.

According to a ninth embodiment of the present invention, when a disk is utilized in a plurality of different computers, an state that occurs in one computer cannot be determined by another computer. Therefore, according to this embodiment, respective deterioration states determined in respective controlling apparatuses employing disks are recorded onto the disk itself. Namely, a feature of this embodiment is that the optical disk drive controlling apparatus includes a disk deterioration recording measure for recording the historical progress of the magneto-optic disk deterioration state onto the magneto-optic disk, and a disk deterioration warning and data backup creating measure for giving a warning signal to a user based on the recorded disk deterioration state or automatically creating a data backup onto another magneto-optic disk.

A method of using the disk deterioration recording measure and the disk deterioration warning and data backup creating measure is described below. The flow chart of FIG.7 may be used to understand this method.

Each time one of the plurality of disks is utilized, its abnormal state is recorded in the apparatus, and the recorded abnormal state is accumulated with previously recorded abnormal states periodically recorded a predetermined time interval of one week or one month, for example.

If the disk abnormal state exceeds the previously established standard level, or even if the abnormal state does not exceed the standard level but an accumulated abnormal state value shows an increase in the rate of abnormal state occurrence that exceeds a standard rate for disk deterioration, data on the disk is saved onto another disk previously set aside in the library for such a purpose, or the controlling apparatus gives a user warning signal. Therefore, even if a disk is utilized in a plurality of different computer systems, the state of an abnormal state that occurs in one system can be determined by another system.

The tenth and eleventh embodiments discussed above can be combined with the ninth embodiment, and can be understood by referring to the flow chart of FIG. 5.

For example, when the system's inside area recording measure of the tenth embodiment is applied to the ninth embodiment, the historical progress of the abnormal state of the disk, that is, the disk deterioration state, is recorded in a file of the filing system of the disk. Consequently, the apparatus can be easily utilized for reading out and writing in data, as controlled by the host computer 2.

When the system's outside area recording measure of the eleventh embodiment is combined with the ninth embodiment, an area outside of the filing system of the disk is used to record the historical progress of the deterioration state of the disk. Consequently, danger of erasing the historical progress due to user error can be eliminated.

FUNCTIONAL EFFECT OF THE PREFERRED EMBODIMENTS

In the first embodiment, the magneto-optic disk drive controlling apparatus in which the magneto-optic disk drive apparatus for inserting and removing the magneto-optic disk by manual operation or by automatic transportation controlled by the host computer comprises a disk deterioration determining measure for determining the deterioration state of the magneto-optic disk, and a disk deterioration tolerance excess alarming measure for creating a backup of the data or issuing an alarm to stop using the magneto-optic disk the determined disk deterioration state exceeds the deterioration tolerance range. Therefore, the user may take appropriate action, such as creating the data backup, so that the data can be preserved over the usable lifetime of the magneto-optic disk and thereby the reliability of the data can be enhanced.

The second embodiment in connection with the first embodiment further comprises a disk recognizing measure for recognizing each of a plurality of magneto-optic disks, a disk deterioration recording measure for recording the historical progress of a recognized magneto-optic disk's deterioration state, and a disk deterioration alarm measure for emitting an alarm signal based on the recorded content of the disk deterioration state. With such a construction, the same functional effect as that of the first embodiment can be obtained, and the reliability of the data can be enhanced considerably.

The third embodiment in connection with the first embodiment further comprises a disk deterioration recording measure for recording the historical progress of the magneto-optic disk deterioration state on the magneto-optic disk, and a disk deterioration alarm measure for emitting an alarm signal based on the disk deterioration state. With such a construction, the same functional effect as that of the first embodiment can be obtained, and further the reliability of the data can be enhanced considerably.

In the fourth embodiment, the optical disk drive controlling apparatus in which the magneto-optic disk drive apparatus for inserting and removing the magneto-optic disk by manual operation or by automatic transportation as controlled by the host computer comprises a disk deterioration determining measure for determining the deterioration state of the magneto-optic disk, and a disk deterioration tolerance excess data backup creating measure for automatically creating a backup of the data onto another magneto-optic disk when the determined disk deterioration state exceeds the deterioration tolerance range. Consequently, the data can be preserved over the usable lifetime of the magneto-optic disk, and thereby the reliability of the data can be enhanced.

The fifth embodiment in connection with the fourth embodiment further comprises a disk recognizing measure for recognizing each of a plurality of magneto-optic disks, a disk deterioration recording measure for recording the historical progress of the deterioration state of a recognized magneto-optic disk in the drive controlling apparatus, and a disk deterioration data backup creating measure for automatically creating a back up of the data onto another magneto-optic disk based on the recorded disk deterioration state. With such a construction, the same functional effect as that of the fourth embodiment can be obtained, and the reliability of the data can be enhanced considerably.

The sixth embodiment in connection with the fourth embodiment further comprises a disk deterioration recording measure for recording the historical progress of the magneto-optic disk deterioration state, and a disk deterioration data backup creating measure for automatically creating a backup of the data onto another magneto-optic disk based on the disk deterioration state. With such a construction, the same functional effect as that of the fourth embodiment can be obtained, and the reliability of the data can be enhanced considerably.

In the seventh embodiment, the optical disk controlling apparatus in which the magneto-optic disk drive apparatus for inserting and removing the magneto-optic disk by manual operation or by automatic transportation as controlled by a host computer comprises a disk deterioration determining measure for determining the deterioration state of the magneto-optic disk, and a disk deterioration tolerance excess alarm and data backup creating measure for giving a user warning signal based on the deterioration state when the determined deterioration state exceeds a deterioration tolerance range or automatically creating a backup of the data onto another magneto-optic disk. Consequently, it is possible to preserve the data over the usable lifetime of the magneto-optic disk, and the reliability of the data can be enhanced.

The eighth embodiment in connection with the seventh embodiment further comprises a disk recognizing measure for recognizing each of a plurality of magneto-optic disks, a disk deterioration recording measure for recording the historical progress of a recognized magneto-optic disk's deterioration state in the controlling apparatus, and a disk deterioration warning and data backup creating measure for giving a user warning signal based on the recorded content of the deterioration state or automatically creating a backup of the data onto another magneto-optic disk. With such a construction, the same functional effect as that of the seventh embodiment can be obtained, and thereby the reliability of the data can be enhanced considerably.

The ninth embodiment in connection with the seventh embodiment further comprises a disk deterioration recording measure and a disk deterioration warning and data backup creating measure for giving a user warning signal based on the deterioration state or automatically creating a backup of the data onto another magneto-optic disk. With such a construction, the reliability of the data can be enhanced considerably.

The tenth embodiment in connection with the third, sixth, and ninth embodiments further comprises a system's inside area recording measure for recording the historical progress of the magneto-optic disk deterioration state in an inside area of a filing system of the controlling apparatus. With such a construction, the same functional effect as that of the first, fourth, and seventh embodiments can be obtained, and thereby the reliability of the data can be enhanced considerably.

The eleventh embodiment in connection with the third, sixth, and ninth embodiments further comprises a system's outside area recording measure for recording the historical progress of the magneto-optic disk deterioration state in an outside area of a filing system of the controlling apparatus. With such a construction, the same functional effect as that of the first, fourth, and seventh embodiments can be obtained, and thereby the reliability of the data can be enhanced considerably.

Embodiments for a file manager utilizing the controlling apparatus described above are described below.

OTHER PREFERRED EMBODIMENTS

Figure 8:
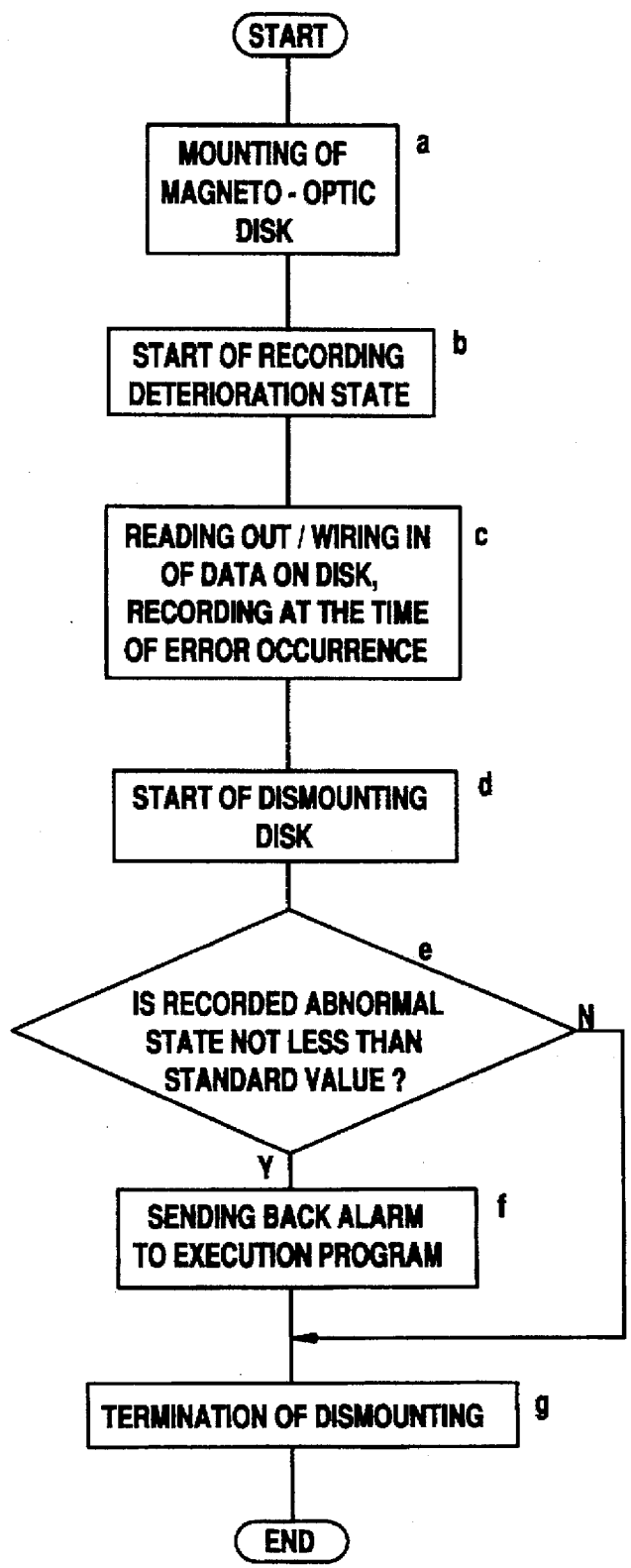
FIG. 8 is a flow chart according to a twelfth embodiment of the present invention.
Figure 9:
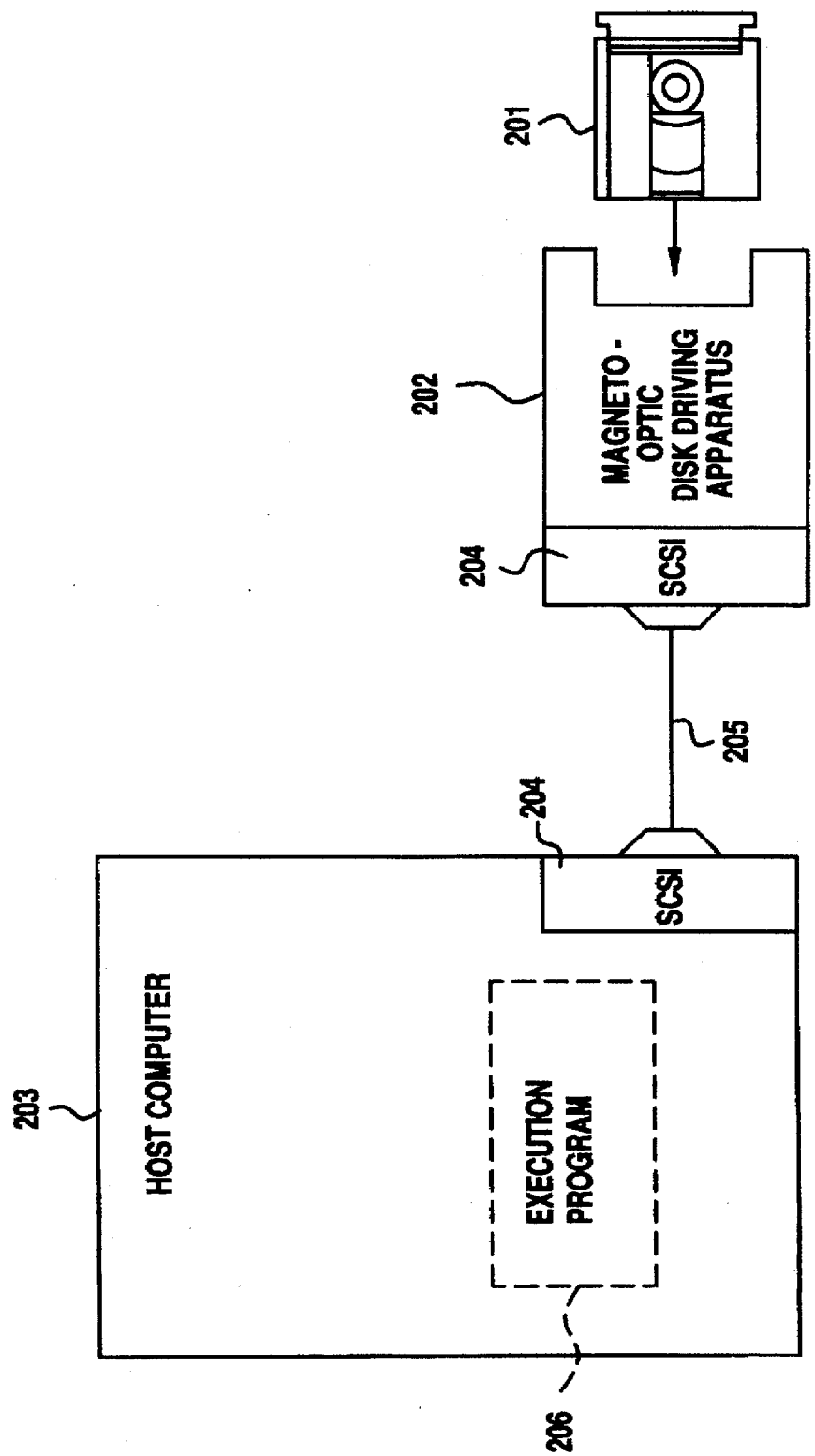
FIG. 9 is a schematic block diagram showing an apparatus for implementing an IS&C file format in a magneto-optic disk.

A twelfth embodiment is explained below with reference to FIGS. 8 through 10. First, a construction of an apparatus using an IS&C (Image Save and Carry) file formal is explained. FIG.9 shows a schematic diagram of the apparatus.

The apparatus is comprised of a magneto-optic disk drive apparatus 202 for installing a magneto-optic disk 201 therein and a host computer 203 for driving and controlling the drive apparatus 202. The magneto-optic disk drive apparatus 202 is an apparatus for having installed therein only a single magneto-optic disk 201 and there exists another apparatus for having installed therein a plurality of magneto-optic disks 201. The magneto-optic disk drive apparatus 202 and the host computer 203 are interconnected through a SCSI connector 205 connecting two SCSIs 204, in accordance with the IS&C Specification. FIG. 10 schematically shows a construction of software in the host computer 203 for realizing the IS&C file format on the magneto-optic disk 201.

The IS&C file format comprises an execution program 206 constructed with an application part 206a and a data format controlling part 206b, a file manager 207 (disk format controlling part), a driver software controlling part 208, and an operating system 209.

When the file manager 207 performs an access operation, the execution programs 206 run and reading-out/writing-in data on the magneto-optic disk 201 is performed. The execution program 206 is, for instance, a part for prescribing data treatment or data form when using image data for medical treatment purposes.

In connection with such a construction, an operational example of the apparatus adopting the file format is described below.

After a user installs a magneto-optic disk 201 into the magneto-optic disk drive apparatus 202, a reading/writing command is issued to the magneto-optic disk apparatus 202 by the execution program 206 from the host computer 203, and thereby data on the magneto-optic disk 201 are accessed or new data are recorded thereon. In order to realize the IS&C file format in the magneto-optic disk 201, processing of all input and output data is performed through the input/output function group called a "file manager" known as the file manager 207. When writing in data, the magneto-optic disk drive apparatus 202 confirms whether the data are recorded correctly by the verifying the data immediately after the data are written in of recorded.

When the magneto-optic disk drive apparatus 202 senses an abnormal state during verification, the following operations may take place:

1) the apparatus 202 is restored to its original state;
2) the apparatus is restored to its original state by "retrying";
3) the apparatus is restored to its original state with a CRC;
4) the apparatus is restored to its original state with an ECC;
5) the apparatus is restored to its original state by writing the data into a substitute sector; and
6) the apparatus is not restored to its original state.

In accordance with operations 1) to 6), respective suitable treatments corresponding thereto are performed in the magneto-optic disk driving apparatus 202.

In the operations from 1) through 5), it is possible to read out or reproduce the recorded data, and the respective operations can be continuously performed. Furthermore, it is possible to know which operation is used to restore the magneto-optic disk drive apparatus 202, which is commanded by the host computer 203, by issuing an error code for the command.

According to the twelfth embodiment, a file manager 207 for realizing an IS&C file format in a magneto-optic disk 201 by performing reading/writing operations of data onto the magneto-optic disk 201 in the magneto-optic drive apparatus 202 by use of an execution program 206 comprises a deterioration state determining measure for determining a deterioration state of the magneto-optic disk 201, and a deterioration state alarm measure for emitting an alarm signal to perform data backup or to stop using the disk for the execution program 206 when a determined deterioration state exceeds a standard value.

An operational example of the deterioration state determining measure and the deterioration state alarm measure is explained below, with reference to the flow chart of FIG. 8.

When a user inserts a magneto-optic disk 201 into a magneto-optic disk drive apparatus 202, an execution program 206 reads out and writes in data onto the magneto-optic disk 201 using an IS&C file manager 207 and a magneto-optic disk driving apparatus 202. In the IS&C file manager 207, when the magneto-optic disk 201 is initially accessed by the execution program 206, a "mount" operation is performed and control information on the magneto-optic disk 201 is read out (a, b).

When an abnormal state is detected, previously referred to above as 3) through 6), during reading-out/writing-in of data, it signifies that abnormal data may be present in the data recorded on a sector of the magneto-optic disk 201. A reason for the occurrence of the abnormal state is recorded in the magneto-optic disk drive apparatus 202 (c).

In a "dismount" operation ["Dismount" of], writing in of changed control information is performed (d). An abnormal state of deterioration which is previously recorded on the magneto-optic disk 201 is evaluated during the dismount operation (e). When the abnormal state of deterioration exceeds a previously established standard value, it indicates that expiration of the disk's useful lifetime is approaching. At this time, a backup of the data is performed on the magneto-optic disk 201 and an alarm signal is issued for the execution program 206 to immediately stop using the disk (f). The dismount operation comes to an end when the abnormal state of deterioration does not exceed the standard value or after the alarm is issued (9). On this occasion, in the execution program 206, the part of the file manager 207 in connection with the input/output of IS&C can be definitely separated from the other part thereof. Therefore, the function of the apparatus can be added, by replacing the part of the file manager 207 presently combined by the other one having various measures just like the embodiment.

As mentioned above, the file manager 207 is able to evaluate the deterioration state of the magneto-optic disk 201 using the deterioration state determining measure. In particular, if the deterioration state is at an extreme condition, the deterioration state alarm measure emits an alarm signal to the user using the execution program 206. Based on the alarm content, the user takes appropriate action, such as performing a data backup or stopping the use of the disk, and thereby the data can be preserved over the useful lifetime of the magneto-optic disk 201.

When the deterioration of the magneto-optic disk 201 proceeds at a constant rate, the twelfth embodiment can cope with such deterioration. However, it is presumed that deterioration may proceed rapidly or at an accelerated rate after a certain time period passes because of certain environmental conditions affecting the magneto-optic disk 201. For this reason, even though the evaluated reliability is within the prescribed standard level, it is important that an alarm is given to the user when the deterioration rate changes rapidly. In order to recognize a rapid rate of deterioration it is necessary to periodically evaluate the reliability of the disk and record its historical progress.

Figure 10:
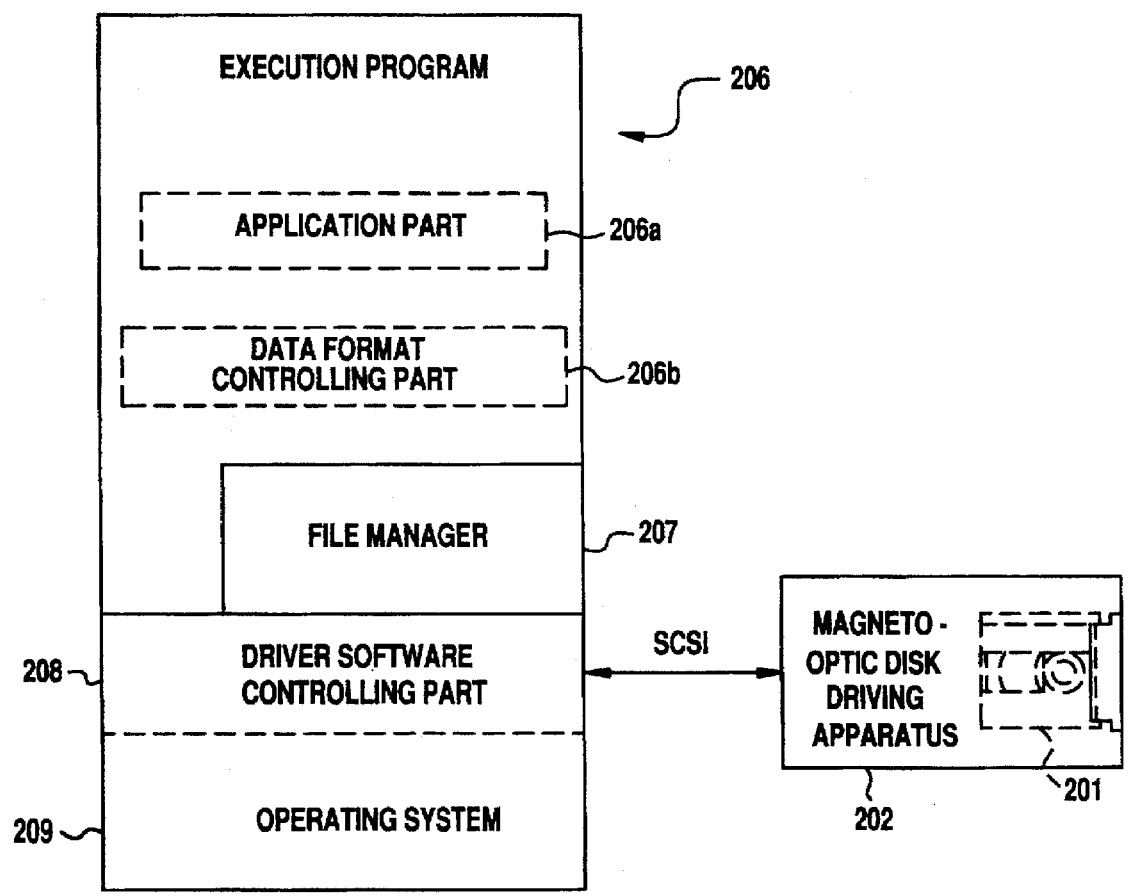
FIG. 10 is a block diagram showing a schematic construction of software for a host computer.

In the present embodiment, the IS&C file manager 207, as shown in FIG. 10, comprises a recording measure for periodically recording a deterioration state of the magneto-optic disk 201 in the host computer 203, which is employed as the deterioration state controlling apparatus, and a deterioration state alarm measure for emitting an alarm signal to the execution program 206 for the purpose of performing a data backup or stopping the usage of the disk when the deterioration state periodically recorded in the host computer 203 exceeds the standard value.

Figure 11:
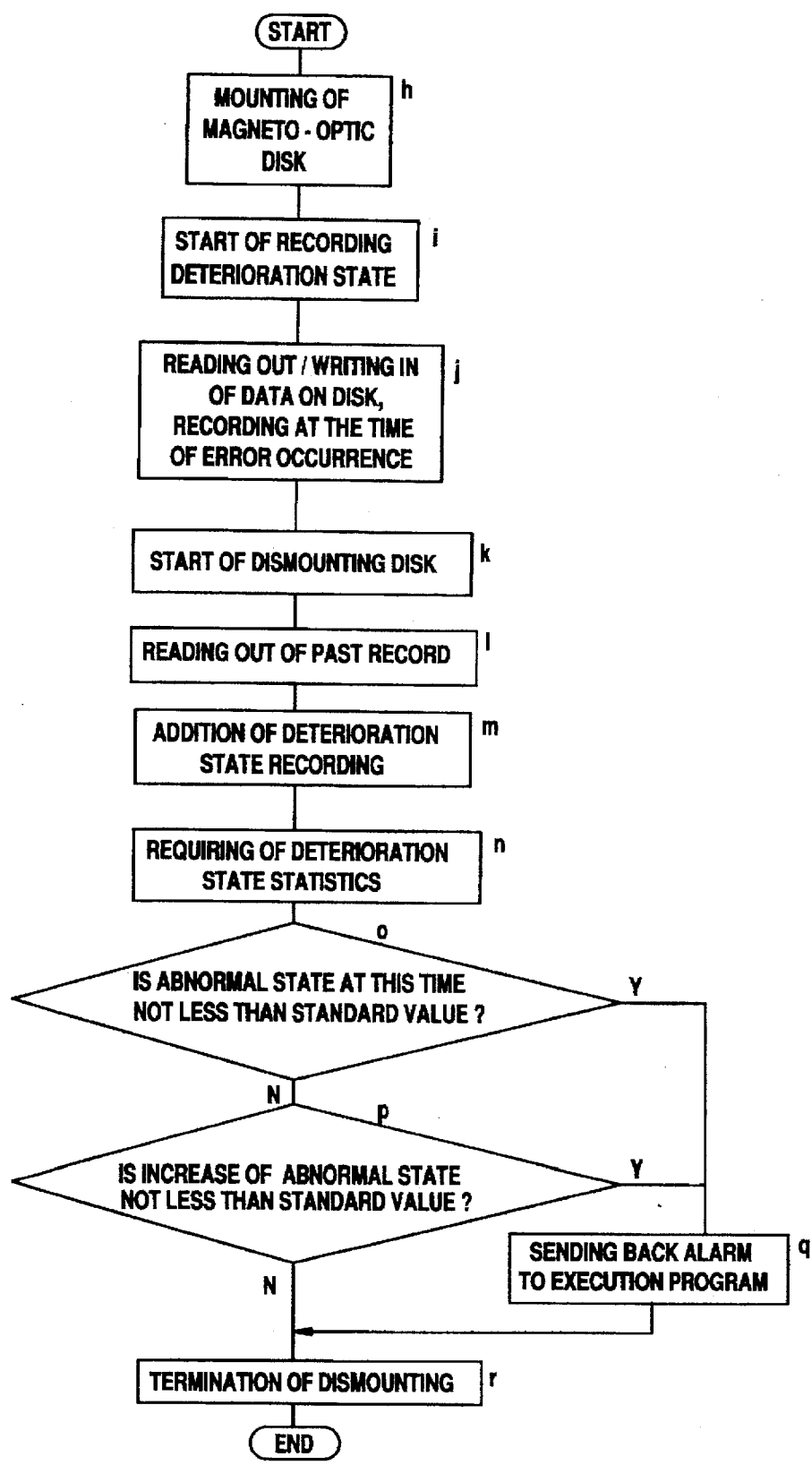
FIG. 11 is a flow chart according to a thirteenth embodiment of the present invention.

An example of an operation of the periodic recording measure in the deterioration state controlling apparatus and the deterioration state alarm measure is explained below, with reference to the flow chart of FIG. 11.

First, in order to be able to recognize and identify each of a plurality of magneto-optic disks 201, a number and name is given thereto. The magneto-optic disk drive apparatus 202 controls the respective magneto-optic disks 201 by use of the given number and name. In the IS&C file format, such control can be realized by use of a volume number and a volume name. During a mounting operation, a similar treatment as that of FIG. 8 is performed (h–j). During a dismounting operation, a deterioration state is evaluated, and statistics related to the deterioration state are made for each predetermined period of one week or one month, for example, and recorded in the host computer 203 (k–n). In general, such statistical data of is recorded in a file on a fixed magnetic disk (not shown in the drawing). When an abnormal value of the deterioration state statistics exceeds a previously established standard value (o), or even when the abnormal value of the deterioration state does not exceed the previously established standard value but the rate of abnormal state occurrence exceeds a standard value (p), the the useful lifetime of the magneto-optic disk 201 is approaching its end. At this time, a backup of the data is made of the magneto-optic disk 201, and an alarm is issued immediately stop the usage of the magneto-optic disk 201 (q). The dismount operation comes to an end after the alarm is issued or when the abnormal value of the deterioration state does not exceed the standard value (r).

As mentioned above, the reliability evaluation is done periodically for the magneto-optic disk 201 and the statistics of the historical progress of deterioration thereof is recorded.

Thereby, even though the deterioration state of the magneto-optic disk 201 progresses at an accelerated rate after a period of constant deterioration rate elapses due to the environmental condition of the disk 201, the deterioration state can be determined precisely by recording the statistics of the historical progress of deterioration. And further, when the deterioration state changes rapidly, an alarm can be given to the user so that the user takes appropriate action, such as making a backup of the data and stopping further usage of the disk. Thereby, the data can be preserved over the useful lifetime of the magneto-optic disk 201.

Next, the fourteenth embodiment is explained.

A characteristic of the magneto-optic disk 201 is that the disk is a portable medium. Namely, even in a computer system physically separated and not connected to a network, for example, data can be used by both jointly.

According to the fourteenth embodiment, the deterioration state determined in a plurality of different computer systems employing the magneto-optic disk 201 is recorded on the magneto-optic disk 201. Namely, the IS&C file manager 207, as shown in FIG. 10, comprises a periodic recording measure for periodically recording a deterioration state of the magneto-optic disk 201 onto the magneto-optic disk 201 itself, and a deterioration state alarm measure for emitting an alarm signal to the execution program 206 for the purpose of performing a data backup or stopping further usage of the disk when the deterioration state periodically recorded on the magneto-optic disk 201 exceeds the standard value.

An example of the periodic recording measure and the deterioration state alarm measure is explained below.

Each time a magneto-optic disk 201 is utilized, its abnormal state is detected and the detected state is recorded onto the disk itself. At the same time, the recorded state is accumulated for each predetermined period such as one week or one month, for example, and the accumulated abnormal state is recorded onto the magneto-optic disk 201. Consequently, by recording the deterioration state periodically on the magneto-optic disk 201 in such a manner, even when the magneto-optic disk 201 is utilized in a plurality of different computer systems, the state of the abnormal state occurring in each of the different computer systems can be determined. Furthermore, when the abnormal state exceeds a previously established standard value, or when rate of abnormal state occurrence exceeds a standard value for the rate even if the abnormal state itself does not exceed the previously established standard value, the useful lifetime of the disk is approaching an end. At this time, a data backup of the disk is made or an alarm is issued to immediately stop the usage of the magneto-optic disk 201. If the user takes appropriate action such as making a data backup, for example, the data can be preserved over the useful lifetime of the magneto-optic disk 201.

According to a fifteenth embodiment, a surface of the magneto-optic disk 201 is treated as a volume. Usually, in order to utilize the disk effectively, the volume is entirely controlled by the IS&C file system. If the volume is controlled by the file system in such manner, the simplest method of utilizing the disk system for reading out/writing of the data by the host computer 203 is to treat the system as a unit of the file structure. Specifically, the historical progress of the abnormal deterioration state is recorded in a file.

According to the present embodiment, the file manager, as shown in FIG. 10, comprises a deterioration state recording measure for recording the deterioration state on the magneto-optic disk 201 in an IS&C file. The operation of recording can be performed in the same way as that of the fourteenth embodiment, which records the deterioration state on the magneto-optic disk 201. A deterioration state alarm measure is also provided in the system so that an alarm signal can be issued to the execution program for the purpose of performing a data backup or stopping further usage of the disk when the deterioration state recorded in the IS&C file exceeds the standard value. Thereafter, if the user takes appropriate action, such as making a data backup, for example, the data can be preserved over the useful lifetime of the magneto-optic disk 201.

A sixteenth embodiment is explained below.

As mentioned earlier, when the deterioration state is recorded in the IS&C file, it can be erased by user error. In order to maintain the recorded historical deterioration progress, it is necessary to make the probability of erasing as small as possible.

The present embodiment provides an area, which cannot be utilized by the file system, for recording deterioration state information therein. Namely, a recording measure for recording the deterioration state of the magneto-optic disk 201 in an unused area not belonging to the zone controlling area of the magneto-optic disk 201 is provided in the file manager, as shown in FIG. 10.

In using the IS&C file manager, although control is performed on a zone comprising a group of sectors, the total number of sectors in the disk cannot be evenly divided by the number of sectors comprising the zone. Therefore, residual portion occurs. For instance, in the case of a 5.25-inch magneto-optic disk, the number of sections logically usable on the disk is 314,569 sectors. Since a zone is comprised of 1,024 sectors, an unused area of 201 sectors remains. The unused area is not controlled by the file manager 207 of the IS&C file format. Therefore, there is no danger that the area will be directly accessed by the execution program 206.

Consequently, by recording the deterioration state as an ordinary file in the unused area not belonging to a zone the danger of erasing the data by user error can be eliminated, and the recorded historical deterioration progress can be maintained. And when the abnormal value of the deterioration state recorded in the unused area exceeds a tolerance range, an alarm for performing data backup and stopping further usage of the disk is issued to the execution program 206. Thereby, even when the magneto-optic disk 201 is utilized in a plurality of different computer systems, the user can take appropriate action, such as making a data backup, for example, and thereby the data can be preserved over the useful lifetime of the magnetic disk 201.

A seventeenth embodiment is explained below.

All of the data recorded on the magneto-optic disk 201 are not equally important. For instance, control information data on the magneto-optic disk 201 is likely to have a larger influence on the disk's entire recorded information data than other types of data. Furthermore, by recording certain recorded data of a file from a control area of the magneto-optic disk 201, it is possible to find the data within the file. For this reason, the frequency that the control area of the magneto-optic disk 201 is accessed is greater that the frequency that data in a specified file is accessed.

Since the degree of the deterioration and the frequency that an area is accessed have a positively correlative relationship, the rate (frequency) of deterioration or abnormal state occurrence may be higher in the control area of the magneto-optic disk 201, where the operation of reading-out/writing-in is frequently performed.

According to the present embodiment, the area for which the operation of reading/writing is frequently performed and the area for which such operation is not frequently performed are distinguished from each other. A determining measure for detecting and determining an abnormal state is provided in the present embodiment, particularly emphasizing the frequently accessed control area. Namely, the file manager 207, as shown in FIG. 10 and described in the twelfth through sixteenth embodiments, comprises a deterioration state determining measure for each zone control area for determining the deterioration state of the magneto-optic disk 201. The file manager 207 further comprises a deterioration state alarm measure for each zone for issuing an alarm to the execution program 206 when the deterioration state determined for each zone control area exceeds the standard value established for each type of zone.

Examples of methods of using the deterioration state determining measure for each zone control area and the deterioration state alarm measure for each zone are given below for the respective twelfth through sixteenth embodiments.

According to the twelfth embodiment, the IS&C file format distinguished the area for saving the data representing the volume control information and the file property/file control information from other areas for recording general data, and the control information is recorded in a specified zone. For this reason, an abnormal state occurring on the magneto-optic disk 201 can be determined by summing up and determining the abnormal state for each zone. Since the zone recorded with the volume control information is most important, the reliability of the data on the disk can be increased by making a strict standard value for issuing the alarm. Even though general data may exist in the zone to be recorded in, since the recording zone of the control information is more important than other areas, if the standard value for issuing the alarm is made to be strict, the reliability of the data can be further enhanced. And then, when the abnormal state caused by deterioration exceeds the standard value, the alarm is issued to the execution program 206.

According to the thirteenth embodiment, a volume number and volume name is given to the respective magneto-optic disks in order to control those magneto-optic disks such that the respective magneto-optic disks 201 can be recognized by the controlling host computer 203. Each time the respective magneto-optic disks 201 are utilized, the abnormal state for each zone is recorded in the host computer 203 during dismounting of the disks, and the deterioration state is summed up for each established time period unit of one week or one month, for example, and recorded in the host computer 203.

Furthermore, when the abnormal state caused by deterioration exceeds the previously established standard value, or when the rate of abnormal state occurrence accelerates even though the abnormal state does not exceed the standard value, the alarm is issued to the execution program 206.

According to the fourteenth embodiment, each time the respective magneto-optic disks 201 are utilized, the abnormal state is recorded for each zone. The recorded state is summed up per each established time period unit of one week or one month, for example, and recorded on the magneto-optic disk 201. When the abnormal state caused by deterioration exceeds the previously established standard value, or when the rate of abnormal state occurrence exceeds the standard value even though the abnormal state does not exceed the standard value, the alarm is issued to the execution program 206.

According to the fifteenth embodiment, each time the respective magneto-optic disks 201 are utilized, the abnormal state is recorded for each zone. The recorded state is summed up for each established time period unit of one week or one month, for example, and recorded in a file in the IS&C file system. When the abnormal state caused by deterioration exceeds the previously established standard value, or when the rate of abnormal state occurrence exceeds the standard value even though the abnormal state does not exceed the standard value, the alarm is issued to the execution program 206.

According to the sixteenth embodiment, each time the respective magneto-optic disks 201 are utilized, the abnormal state is recorded for each zone. The recorded state is summed up for each established time period unit of one week or one month, for example, and the historical progress of the abnormal state is recorded in an unused area not belonging to the zone control area of the IS&C file system for the volume. Therefore, the danger of erasing the recorded historical progress due to user error can be eliminated. When the abnormal state caused by deterioration exceeds the previously established standard value, or when the rate of abnormal state occurrence exceeds the standard value even though the abnormal state does not exceed the standard value, the alarm is issued to the execution program 206.

For the twelfth through sixteenth embodiments described above, by determining the deterioration state in accordance with the type of zone control area of the magneto-optic disk 201, the area that undergoes frequent reading/writing operation is distinguished from other areas. In such manner, the abnormal state is detected and determined, paying particular attention to frequently accessed areas.

An eighteenth embodiment is explained below, with reference to FIG. 12.

Figure 12:
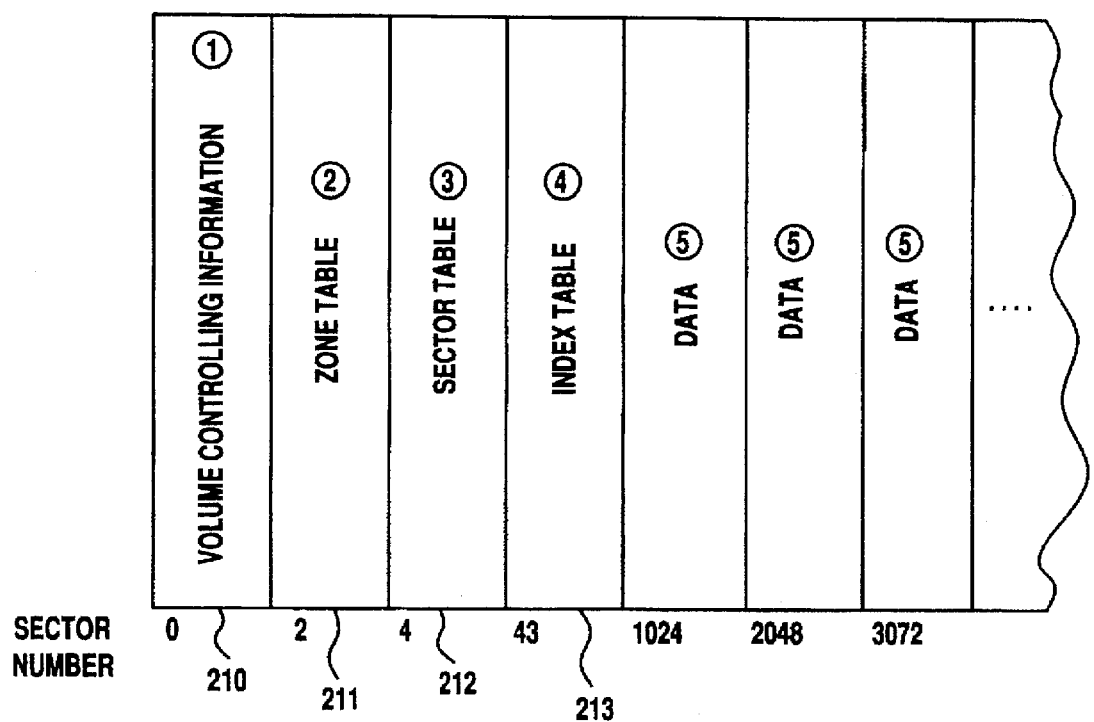
FIG. 12 is an explanatory diagram showing disk controlling information using the IS&C file format.

FIG. 12 schematically shows the information for controlling the magneto-optic disk 201 in the IS&C file format. The information is constructed with four types of control information[;]: a volume controlling information 210, a zone table 211, a sector table 212, and an index table 213.

The volume controlling information 210 is necessarily referred to at the time of "mounting". If some changes are made the data on the magneto-optic disk 201, the information is necessarily rewritten. The above four types of information may be read out and written in most frequently. The zone table 211 and the sector table 212 are referred to and changed mainly creating a file and changing annexed information of the file or changing header information of the file. Since the index table 213 is a collective one of the respective types of file controlling information, the table is necessarily referred to and changed when the file is accessed. The frequency of referring-to and changing is almost proportional to the accessing number of the file. For the types of control information for controlling the magneto-optic disk 201, the frequency of reading/writing differs from each other in accordance with the type thereof.

As mentioned in connection with the seventeenth embodiment, since there exists a positive correlative relationship between the deterioration progress and the access frequency, a danger of deterioration occurring in the disk control area for which the operation of reading/writing is frequently performed may be increased. To cope with such a problem, it is insufficient to take the statistics of the abnormal state of [the] deterioration for each zone, as mentioned in connection with the seventeenth embodiment.

The present invention provides a measure for determining properties of the data recorded on the magneto-optic disk 201, distinguishing, in particular, the area of frequent reading/writing from the area of relatively infrequent reading/writing, and detecting and determining the abnormal state by emphasizing the frequently accessed area.

The file manager described in the twelfth through sixteenth embodiments, as shown in FIG. 10, comprises a deterioration state determining measure for each type of control information for determining the deterioration state of the magneto-optic disk 201 in accordance with the type of control information recorded on the disk, and deterioration state alarm measure for each zone for issuing an alarm to the execution program 206 when the deterioration state determined for each type of control information exceeds the standard value per each type of control information.

Examples of methods using the deterioration state determining measure for each control information, and the deterioration state alarm measure for each zone are explained below for the respective twelfth through sixteenth embodiments.

According to the twelfth embodiment the areas of a disk can be classified into six types: the four types of control information for controlling the magneto-optic disk 201, as shown in FIG. 12, (volume controlling information 210, zone table 211, sector table 212, and index table 213), the ordinary data area, and the header area. Different judgment standards are established for each respective types of area. Of these areas, an emphasis is put only on the area of frequent reading/writing operation in order to detect and determine the abnormal state. When the abnormal state caused by deterioration exceeds the standard value, the alarm is issued to the execution program 206.

According to the thirteenth embodiment, a principal volume number and volume name are given to the disks so each magneto-optic disk 201 may be recognized by the controlling host computer 203, and thereby, the respective disks are controlled. Each time the respective magneto-optic disks 201 are utilized, the abnormal state is recorded in the host computer 203 in accordance with the type of control information during dismounting of the disk. The recorded deterioration state is summed up for the established time period unit of one week or one month, for example, and recorded in the host computer 203. When the abnormal state caused by deterioration exceeds the previously established standard value, or when the rate of abnormal state occurrence exceeds the standard value even though the abnormal state does not exceed the standard value, the alarm is issued to the execution program 206.

According to the fourteenth embodiment, each time the respective magneto-optic disks 201 are utilized, the abnormal state is recorded in accordance with the type of control information. The recorded abnormal state is summed up for the established time period unit of one week or one month, for example, and recorded on the magneto-optic disk 201. When the abnormal state caused by deterioration exceeds the previously established standard value, or when the rate of abnormal state occurrence exceeds the standard value even though the abnormal state does not exceed the standard value, the alarm is issued to the execution program 206.

According to the fifteenth embodiment, each time the respective magneto-optic disks 201 are utilized, the abnormal state is recorded in accordance with the type of control information. The recorded abnormal state is summed up for the established time period unit of one week or one month, for example, and recorded in a file of the IS&C file system. When the abnormal state occurrence caused by deterioration exceeds the previously established standard value, or when the rate of abnormal state occurrence exceeds the standard value even though the abnormal state does not exceeds the standard value, the alarm is issued to the execution program 206.

According to the sixteenth embodiment, each time the respective magneto-optic disks 201 are utilized, the abnormal state is recorded in accordance with the type of control information. The recorded abnormal state is summed up for the established time period unit of one week or one month, for example, and the historical progress of the abnormal state is recorded in an unused area not belonging to the zone controlling area of the IS&C file system for the volume. Thereby, the danger of erasing the historical progress by user error can be eliminated. When the abnormal state caused by deterioration exceeds the previously established standard value, or when the rate of abnormal state occurrence exceeds the standard value even though the abnormal state does not exceeds the standard value, the alarm is issued to the execution program 206.

As to the disk system explained individually for the respective twelfth through sixteens embodiments, by determining the deterioration state in accordance with the type of control information of the magneto-optic disk 201, the property of the data recorded on the magneto-optic disk 201 can be determined, in particular, the information designated for frequent reading/writing operation can be distinguished from that of relatively infrequent reading/writing operation, and the abnormal state can be detected and determined, with particular emphasis placed on frequently read/written information.

FUNCTIONAL EFFECT OF OTHER PREFERRED EMBODIMENTS

In the twelfth embodiment, since the file manager for realizing the IS&C file format in the magneto-optic disk by performing the operation of reading-out/writing-in the data on the magneto-optic disk in the magneto-optic disk drive apparatus by use of the execution program comprises a deterioration determining measure for determining the deterioration state of the afore-mentioned magneto-optic disk, and a deterioration state alarm measure for issuing an alarm to the execution program to perform data backup and stop usage of the disk, when the abnormal value of the determined deterioration state exceeds the standard value, the file manager can evaluate the deterioration state of the magneto-optic disk. In particular, when the extent of the deterioration state is extreme, the alarm can be issued to the user through the execution program for the deterioration state. Based on the alarm content, the user takes appropriate action such as making a data backup, and thereby the data can be preserved over the useful lifetime of the magneto-optic disk. Consequently, the reliability with respect to use-related changes in the magneto-optic disk can be enhanced.

In the thirteenth embodiment, since the file manager for realizing the IS&C file format in the magneto-optic disk by performing the operation of reading-out/writing-in the data on the magneto-optic disk in the magneto-optic disk drive apparatus by use of the execution program comprises a periodic recording measure in the control apparatus for periodically recording the deterioration state of the afore-mentioned magneto-optic disk in the control apparatus, and a deterioration alarm measure for issuing an alarm to the execution program to perform data backup and stop usage of the disk, when the abnormal value of the deterioration state periodically recorded in the control apparatus exceeds the standard value, the same functional effect as that of the twelfth embodiment can be obtained, and the alarm can be issued in advance to the user even when the deterioration of the disk accelerates after a period of constant deterioration rate by periodically recording the deterioration state in the control apparatus.

In the fourteenth embodiment, since the file manager for realizing the IS&C file format in the magneto-optic disk by performing the operation of reading-out/writing-in the data on the magneto-optic disk in the magneto-optic disk drive apparatus by use of the execution program comprises a periodic recording measure in the disk for periodically recording the deterioration state of the afore-mentioned magneto-optic disk onto the magneto-optic disk itself, and a deterioration state alarm measure for issuing an alarm to the execution program to perform data backup and stop usage of the disk, when the abnormal value of the deterioration state periodically recorded on the magneto-optic disk itself exceeds the standard value, the same functional effect as that of the twelfth embodiment can be obtained, and it is possible to determine the state of the abnormal state occurring in the respective different computer systems by periodically recording the deterioration state onto the magneto-optic disk.

In the fifteenth embodiment, since the-file manager for realizing the IS&C file format in the magneto-optic disk by performing the operation of reading-out/writing-in the data on the magneto-optic disk in the magneto-optic disk drive apparatus by use of the execution program comprises a recording measure for recording the deterioration state of the afore-mentioned magneto-optic disk in an IS&C file, and a deterioration state alarm measure for issuing an alarm to the execution program to perform data backup and stop the usage of the disk, when the abnormal value of the deterioration state recorded in the file exceeds the standard value, the same functional effect as that of the twelfth embodiment can be obtained.

In the sixteenth embodiment, since the file manager for realizing the IS&C file format in the magneto-optic disk by performing the operation of reading-out/writing-in the data on the magneto-optic disk in the magneto-optic disk driving apparatus by use of the execution program comprises a recording measure for recording the deterioration state of the afore-mentioned magneto-optic disk in an unused area not belonging to the zone controlling area of the magneto-optic disk, and a deterioration state alarm measure for issuing an alarm to the execution program to perform data backup and stop the usage of the disk, when the abnormal value of the deterioration state recorded in the unused area exceeds the standard value, the same functional effect as that of the twelfth embodiment can be obtained, and it is possible to eliminate the danger of erasing the recorded content due to user error by recording the deterioration state in the unused area.

In the seventeenth embodiment, since the disk system described in the twelfth through sixteenth embodiments further comprises a deterioration state determining measure for each zone controlling area for determining the deterioration state of the magneto-optic disk in accordance with the type of zone controlling area, and a deterioration state alarm measure for each zone for issuing an alarm to the execution program, when the abnormal value of the deterioration state determined for each zone controlling area exceeds the standard value established for each type of zone controlling area, the same functional effect as that of the twelfth embodiment can be obtained, and the deterioration state is determined in accordance with the type of zone controlling area of the disk. Thereby, the frequently accessed areas for reading/writing can be distinguished from the relatively infrequently accessed areas, and the abnormal state can be detected and determined, paying particular attention to the frequently accessed areas.

In the eighteenth embodiment, since the disk system described in the twelfth through sixteenth embodiments further comprises a deterioration state determining measure the deterioration state of the magneto-optic disk in accordance with the type of control information recorded on the disk, and a deterioration state alarm measure for each zone for issuing an alarm to the execution program, when the abnormal value of the deterioration state determined for each zone controlling area exceeds the standard value established for each type of zone controlling area, the same functional effect as that of the twelfth embodiment can be obtained, and the deterioration is determined in accordance with the type of control information area of the disk. Thereby, frequently accessed areas for reading/writing can be distinguished from the relatively infrequently accessed areas, and the abnormal state can be detected and determined, paying particular attention to frequently accessed areas.

Heretofore, various embodiments of the magneto-optic disk drive controlling apparatuses and the applications thereof (such as the file manager, for example) have been described. However, the present invention is not limited to the magneto-optic disk. The embodiments described above may be applied to types of disks, such as optical disks, for example.

What is claimed is:

1. A magneto-optic disk drive controlling apparatus, in which a magneto-optic disk drive apparatus for removing and inserting a magneto-optic disk manually or by automatic transportation is controlled by a host computer, said magneto-optic disk drive controlling apparatus comprising:

a disk deterioration judging mechanism that determines a deterioration state of said magneto-optic disk based at least on a type of data stored on said magneto-optic disk;

disk deterioration recording means for recording a progression of said deterioration state of said magneto-optic disk; and a disk deterioration tolerance excess alarming mechanism that provides a user a warning to stop using said magneto-optic disk or for backing-up data stored on said magneto-optic disk based on said recorded progression of said deterioration state and/or when an extent of said determined deterioration state exceeds a predetermined deterioration tolerance standard.

2. A magneto-optic disk drive controlling apparatus as defined in claim 1, said magneto-optic drive controlling apparatus further comprising:

disk recognizing means for recognizing each of a plurality of magneto-optic disks;

disk deterioration recording means for recording a progression of said deterioration state of each of said plurality of recognized magneto-optic disks into said controlling apparatus; and disk deterioration alarming means for emitting an alarm signal based on said recorded progression of said deterioration state of each of said plurality of recognized magneto-optic disks.

3. A magneto-optic disk drive controlling apparatus as defined in claim 1, said magneto-optic drive controlling apparatus further comprising:

inside-area recording means for recording said progression of said deterioration state of said magneto-optic disk into an inside area of a filing system of said controlling apparatus.

4. A magneto-optic disk drive controlling apparatus as defined in claim 1, said magneto-optic disk drive controlling apparatus further comprising:

outside-area recording means for recording said progression of said deterioration state of said magneto-optic disk into an area outside of a filing system of said controlling apparatus.

5. A magneto-optic disk drive controlling apparatus, in which a magneto-optic disk drive apparatus for removing and inserting a magneto-optic disk manually or by automatic transportation is controlled by a host computer, said magneto-optic disk drive controlling apparatus comprising:

a disk deterioration judging mechanism that determines a deterioration state of said magneto-optic disk based at least on a type of data stored on said magneto-optic disk;

disk deterioration recording means for recording a progression of said deterioration state of said magneto-optic disk; and a disk deterioration tolerance excess data backup creating mechanism that automatically creates a backup of data stored on said magneto-optic disk onto another magneto-optic disk based on said recorded progression of said deterioration state and/or when an extent of said determined deterioration state exceeds a predetermined deterioration tolerance standard.

6. A magneto-optic out disk drive controlling apparatus as defined in claim 5, said magneto-optic disk drive controlling apparatus further comprising:

disk recognizing means for recognizing each of a plurality of magneto-optic disks;

disk deterioration recording means for recording a progression of said deterioration state of each of said plurality of recognized magneto-optic disks into said controlling apparatus; and disk data backup creating means for automatically creating a backup of data onto said other magneto-optic disk based on said recorded progression of said deterioration state for each of said plurality of magneto-optic disks.

7. A magneto-optic disk drive controlling apparatus as defined in claim 5, said magneto-optic drive controlling apparatus further comprising:

inside-area recording means for recording said progression of said deterioration state of said magneto-optic disk into an inside area of a filing system of said controlling apparatus.

8. A magneto-optic disk drive controlling apparatus as defined in claim 5, said magneto-optic disk drive controlling apparatus further comprising:

outside-area recording means for recording said progression of said deterioration state of said magneto-optic disk into an area outside of a filing system of said controlling apparatus.

9. A magneto-optic disk drive controlling apparatus, in which a magneto-optic disk drive apparatus for removing and inserting a magneto-optic disk manually or by automatic transportation is controlled by a host computer, said magneto-optic disk drive controlling apparatus comprising:

a disk deterioration judging mechanism that determines a deterioration state of said magneto-optic disk based at least on a type of data stored on said magneto-optic disk;

disk deterioration recording means for recording a progression of said deterioration state of said magneto-optic disk into said controlling apparatus and/or onto said magneto-optic disk itself; and a disk deterioration tolerance excess warning and data backup creating mechanism for giving a user a warning signal based on said determined deterioration state and/or said recorded progression of said deterioration state, and for automatically creating a backup of data on said magneto-optic disk onto another magneto-optic disk based on said determined deterioration state and/or said recorded progression of said deterioration state.

10. A magneto-optic disk drive controlling apparatus as defined in claim 9, said magneto-optic drive controlling apparatus further comprising:

inside-area recording means for recording said progression of said deterioration state of said magneto-optic disk into an inside area of a filing system of said controlling apparatus.

11. A magneto-optic disk drive controlling apparatus as defined in claim 9, said magneto-optic disk drive controlling apparatus further comprising:

outside-area recording means for recording said progression of said deterioration state of said magneto-optic disk into an area outside of a filing system of said controlling apparatus.

12. An optical disk driving controlling apparatus, in which an optical disk drive apparatus for removing and inserting an optical disk manually or by automatic transportation is controlled by a host computer, said optical disk drive controlling apparatus comprising:

a disk deterioration judging mechanism that determines a deterioration state of said optical disk based at least on a type of data stored on said optical disk;

disk deterioration recording means for recording a progression of said deterioration state of said optical disk; and a disk deterioration tolerance excess alarming mechanism that provides a user a warning to stop using said optical disk or for backing-up data stored on said optical disk based on said recorded progression of said deterioration state and/or when an extent of said determined deterioration state exceeds a predetermined deterioration tolerance standard.

13. An optical disk drive controlling apparatus as defined in claim 12, said optical disk drive controlling apparatus further comprising:

disk recognizing means for recognizing each of a plurality of optical disks;

disk deterioration recording means for recording a progression of said deterioration state of each of said plurality of recognized optical disks into said controlling apparatus; and disk deterioration alarming means for emitting an alarm signal based on said recorded progression of said deterioration state of each of said plurality of optical disks.

14. An optical disk drive controlling apparatus as defined in claim 12, said optical drive controlling apparatus further comprising:

inside-area recording means for recording said progression of said deterioration state of said optical disk into an inside area of a filing system of said controlling apparatus.

15. An optical disk drive controlling apparatus as defined in claim 12, said optical disk drive controlling apparatus further comprising:

outside-area recording means for recording said progression of said deterioration state of said optical disk into an area outside of a filing system of said controlling apparatus.

16. An optical disk drive controlling apparatus, in which an optical disk drive apparatus for removing and inserting an optical disk manually or by automatic transportation is controlled by a host computer, said optical disk drive controlling apparatus comprising:

a disk deterioration judging mechanism that determines a deterioration state of said optical disk based at least on a type of data stored on said optical disk;

disk deterioration recording means for recording a progression of said deterioration state of said optical disk; and a disk deterioration tolerance excess data backup creating mechanism that automatically creates a backup of data stored on said optical disk onto another optical disk based on said recorded progression of said deterioration state and/or when an extent of said determined deterioration state exceeds the deterioration tolerance standard.

17. An optical disk drive controlling apparatus as defined in claim 16, said optical disk drive controlling apparatus further comprising:

disk recognizing means for recognizing each of a plurality of optical disks;

disk deterioration recording means for recording a progression of said deterioration state of each of said plurality of recognized optical disks into said controlling apparatus; and disk deterioration data backup creating means for automatically creating a backup of data onto said other optical disk based on said recorded progression of said deterioration state of each of said plurality of optical disks.

18. An optical disk drive controlling apparatus as defined in claim 16, said optical drive controlling apparatus further comprising:

inside-area recording means for recording said progression of said deterioration state of said optical disk into an inside area of a filing system of said controlling apparatus.

19. An optical disk drive controlling apparatus as defined in claim 16, said optical disk drive controlling apparatus further comprising:

outside-area recording means for recording said progression of said deterioration state of said optical disk into an area outside of a filing system of said controlling apparatus.

20. An optical disk drive controlling apparatus, in which an optical disk drive apparatus for removing and inserting an optical disk manually or by automatic transportation is controlled by a host computer, said optical disk drive controlling apparatus comprising:

a disk deterioration judging mechanism that determines a deterioration state of said optical disk based at least on a type of data stored on said optical disk;

disk deterioration recording means for recording a progression of said deterioration state of said optical disk into said controlling apparatus and/or onto said optical disk itself; and a disk deterioration tolerance excess warning and data backup creating mechanism for giving a user a warning signal based on said determined deterioration state and/or said recorded progression of said deterioration state, and for automatically creating a backup of data on said optical disk onto another optical disk based on said determined deterioration state and/or said recorded progression of said deterioration state.

21. An optical disk drive controlling apparatus as defined in claim 20, said optical drive controlling apparatus further comprising:

inside-area recording means for recording said progression of said deterioration state of said optical disk into an inside area of a filing system of said controlling apparatus.

22. An optical disk drive controlling apparatus as defined in claim 20, said optical disk drive controlling apparatus further comprising:

outside-area recording means for recording said progression of said deterioration state of said optical disk into an area outside of a filing system of said controlling apparatus.

23. A method of preserving data stored on a magneto-optical or optical recording medium over a life span of said recording medium, using a recording medium disk drive apparatus, said method comprising the steps of:

determining a deterioration state of said recording medium by evaluating data recorded on said recording medium;

recording a progression of said deterioration state of said recording medium; and transferring said data stored on said recording medium to another recording medium based on said progression of said deterioration state and/or when said determined deterioration state of said recording medium exceeds a deterioration tolerance level.

* * * * *